(12) United States Patent
Woodard et al.

(10) Patent No.: US 10,578,361 B2
(45) Date of Patent: Mar. 3, 2020

(54) MICROWAVE FURNACE FOR THERMAL PROCESSING

(71) Applicant: Desktop Metal, Inc., Burlington, MA (US)

(72) Inventors: Nathan Woodard, Medford, MA (US); Emanuel M. Sachs, Newton, MA (US)

(73) Assignee: Desktop Metal, Inc., Burlington, MA (US)

( * ) Notice: Subject to any disclaimer, the term of this patent is extended or adjusted under 35 U.S.C. 154(b) by 161 days.

(21) Appl. No.: 15/961,643

(22) Filed: Apr. 24, 2018

(65) Prior Publication Data

US 2018/0306512 A1    Oct. 25, 2018

Related U.S. Application Data

(60) Provisional application No. 62/489,385, filed on Apr. 24, 2017.

(51) Int. Cl.
| | |
|---|---|
| F27D 11/12 | (2006.01) |
| F27D 1/00 | (2006.01) |
| B32B 5/08 | (2006.01) |
| B32B 33/00 | (2006.01) |
| H05B 6/64 | (2006.01) |

(Continued)

(52) U.S. Cl.
CPC ............ *F27D 1/0006* (2013.01); *B22F 3/003* (2013.01); *B32B 5/08* (2013.01); *B32B 33/00* (2013.01); *F27B 5/10* (2013.01); *F27B 5/14* (2013.01); *F27D 11/12* (2013.01); *F27D 99/0001* (2013.01); *H05B 6/6402* (2013.01); *H05B 6/647* (2013.01); *H05B 6/6491* (2013.01); *B22F 2998/10* (2013.01); *B22F 2999/00* (2013.01); *B32B 2262/105* (2013.01); *B32B 2262/106* (2013.01); *B32B 2305/22* (2013.01); *B32B 2307/304* (2013.01); *B32B 2307/412* (2013.01); *B32B 2307/416* (2013.01);

(Continued)

(58) Field of Classification Search
CPC .............................. F27D 1/0006; F27D 11/12
See application file for complete search history.

(56) References Cited

U.S. PATENT DOCUMENTS 6,163,020 A * 12/2000 Bartusch .............. H05B 6/6402
  219/746
2018/0306512 A1 * 10/2018 Woodard ................ B22F 3/003

FOREIGN PATENT DOCUMENTS

CN          204128350 U      1/2015

OTHER PUBLICATIONS

International Search Report and Written Opinion for Int'l Application No. PCT/US2018/029177, titled: Microwave Furnace for Thermal Processing, dated Jul. 12, 2018, 17 pages.

* cited by examiner

*Primary Examiner* — Scott R Kastler
(74) *Attorney, Agent, or Firm* — Bookoff McAndrews, PLLC

(57) ABSTRACT

A furnace system includes a heating chamber, a retort assembly, and a waveguide. The heating chamber includes a shell encompassing an insulation layer and a working volume, where the working volume is configured to receive at least one part for heat treatment. The retort assembly is supported within the insulation layer and includes an inner retort surface facing the working volume. The inner retort surface is formed of at least one carbon compound reflective of microwave radiation, and the retort assembly defines a retort aperture. The waveguide is configured to direct micro- (Continued)

wave radiation from a microwave source to the retort aperture.

23 Claims, 28 Drawing Sheets

(51) Int. Cl.
    *F27B 5/14*     (2006.01)
    *F27B 5/10*     (2006.01)
    *B22F 3/00*     (2006.01)
    *F27D 99/00*     (2010.01)

(52) U.S. Cl.
    CPC ....... *B32B 2311/24* (2013.01); *B32B 2313/04* (2013.01); *F27D 2099/0028* (2013.01)

MICROWAVE FURNACE FOR THERMAL PROCESSING

RELATED APPLICATION

This application claims the benefit of U.S. Provisional Application No. 62/489,385, filed on Apr. 24, 2017. The entire teachings of the above application are incorporated herein by reference.

BACKGROUND

Metal injection molding (MIM) is a metalworking process useful in creating a variety of metal objects. A mixture of powdered metal and binder (e.g., a polymer such as polypropylene) forms a "feedstock" capable of being molded, at a high temperature, into the shape of a desired object. The initial molded part, also referred to as a "green part," then undergoes a debinding process to remove the binder, followed by a sintering process. During sintering, the part is brought to a temperature near the melting point of the powdered metal, which evaporates any remaining binder and forming the metal powder into a solid mass, thereby producing the desired object.

Additive manufacturing, also referred to as 3D printing, includes a variety of techniques for manufacturing a three-dimensional object via an automated process of forming successive layers of the object. 3D printers may utilize a feedstock comparable to that used in MIM, thereby creating a green part without the need for a mold. The green part may then undergo comparable debinding and sintering processes to produce the object.

Furnaces used for debinding and sintering of green objects and brown objects typically employ conventional thermal heating methods or direct microwave sintering. Microwave thermal processing has been performed at extremely high temperatures (e.g., 500-900 C and above) in the context of ceramic processing, and much less commonly in the context of metal sintering. In general, microwave-enhanced processing can provide external heating to a part by way of conventional heating elements while simultaneously providing some degree of internal heating by way of microwaves.

SUMMARY

Example embodiments include a furnace system includes a heating chamber, a retort assembly, and a waveguide. The heating chamber includes a shell encompassing an insulation layer and a working volume surrounded by the insulation layer, where the working volume is configured to receive at least one part for heat treatment. The retort assembly is supported within the insulation layer and having an inner retort surface defining the working volume. The inner retort surface may be formed of at least one carbon compound reflective of microwave radiation, and the retort assembly may define a retort aperture. The waveguide may extend through the insulation layer, and may be configured to direct microwave radiation from a microwave source to the retort aperture such that at least some of the microwave radiation propagates through the working volume.

In further embodiments, a waveguide insulation may occupy an internal volume of the waveguide, the waveguide insulation being substantially microwave transparent. The waveguide insulation may occupy a widthwise span of the waveguide, and the widthwise span may be contiguous with the insulation layer.

The inner retort surface may be configured to reflectively contain a majority of the microwave radiation within the working volume. The heating chamber may define at least one chamber aperture, where the waveguide extends from the microwave source to the retort via the chamber aperture. The heating chamber may define at least one microwave aperture through the shell that is configured to receive microwave power from the microwave source, and the waveguide may extend from the chamber aperture to the retort aperture to direct the microwave radiation into the working volume. An insulating wall may be coupled to the insulation layer and may form a portion of an interior surface of the waveguide. The portion of the interior surface of the waveguide may be formed of at least one carbon compound, which may include graphite.

Further embodiments may include an electrically-resistive heating arrangement disposed between the insulating layer and the retort assembly. The at least one carbon compound may include graphite. The waveguide may include an inner surface that is substantially reflective of the microwave radiation. The waveguide may include an inner surface formed of graphite. The waveguide may include an inner surface lined with a graphite foil.

Further embodiments may include a furnace system comprising a heating chamber, an insulation layer, an a waveguide. The heating chamber may include a shell supporting therein a retort assembly having an inner surface that defines the working volume within the retort, the working volume being configured to receive at least one part for heat treatment. The insulation layer may surround the retort and may be configured to provide thermal insulation between the retort and the shell. The working volume may be configured to receive at least one part for heat treatment. The inner retort surface may be formed of at least one carbon compound having sufficiently high conductivity to be reflective of microwave radiation, the retort assembly defining a retort aperture. The waveguide may be configured to direct microwave radiation from a microwave source located outside the insulation layer to the retort aperture such that at least some of the microwave power is coupled into the working volume.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Described herein are devices, systems, and methods related to additive manufacturing (also referred to as three-dimensional (3D) printing), where a design, such as a computer-aided drafting (CAD) file, is provided to a computer operably connected to a three-dimensional printer (e.g., a three-dimensional metal printer), and the object represented by the design can be manufactured in a layer-by-layer fashion by the three-dimensional printer.

Example embodiments may be implemented in additive manufacturing systems using metal as a build material for forming a three-dimensional object. A variety of commercially available compositions have been engineered for metal injection molding ("MIM"). These highly engineered materials can also be adapted for use as a build material in printing techniques such as fused filament fabrication ("FFF"), or other fabrication techniques such as stereolithography or binderjetting. Any reference to "MIM materials," "powder metallurgy materials," "MIM feedstocks," or the like shall generally refer to metal powder and/or ceramic powder mixed with one or more binding materials, e.g., a backbone binder that holds everything together and a bulk binder that carries the metal and backbone into position within a mold or print, unless a different meaning is explicitly provided or otherwise clear from the context. These materials, or other materials similarly composed of metal powder and a binder system, may be used to fabricate green parts that can be debound and sintered into fully densified metallic objects, and may be processed into a final object as contemplated herein. The final object may include a metal, a metal alloy, a ceramic, or another suitable combination of materials.

In the case of conventional furnaces, thermal insulation is often employed for a variety of reasons that will be familiar to a person of ordinary skill in the art. In many conventional furnaces, a furnace that operates at 900 C to 1600 C may utilize several inches of Alumina fiber insulation and/or Graphite fiber insulation. Various insulation systems, arrangements and methods have been developed that are capable of providing for insulating R values in a range from 0.03 to 1 W/MK. In the case of metal processing, including sintering of powder metal parts, a furnace chamber can be sealed in gas tight manner, relative to ambient surrounding atmosphere, and can include a high strength chamber wall of sufficient mechanical strength to withstand vacuum pressure.

Figure 1:
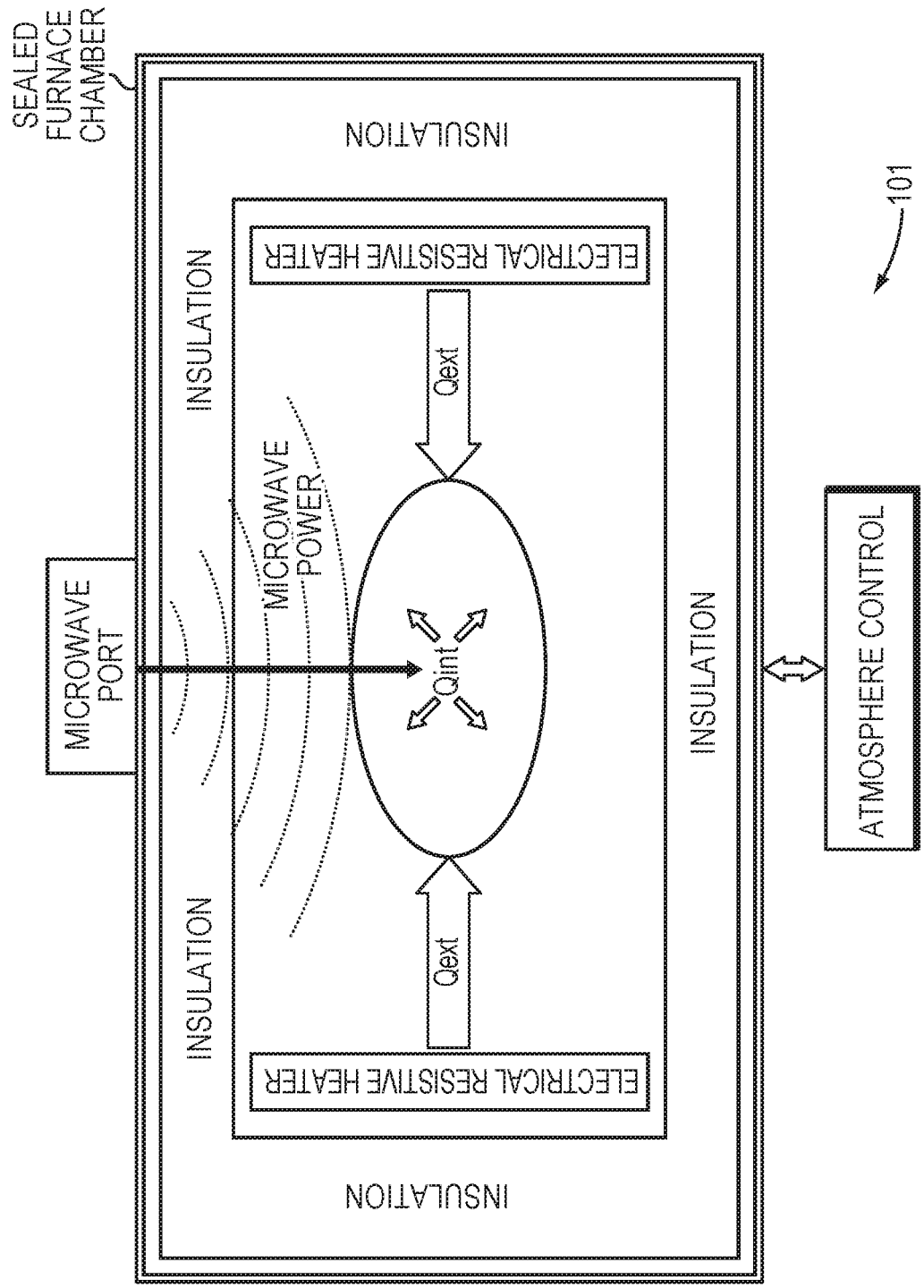
FIG. 1 is a schematic diagram of a conventional microwave-electric furnace.

FIG. 1 illustrates a conventional Microwave-Electric hybrid processing furnace 101. A sealed furnace chamber can be arranged in gaseous communication with an atmospheric control system including high purity gas sources, vacuum pumps, gas pumps, and various other components connected through manifolds that can be configured based on a wide variety of techniques that will be familiar to a person of ordinary skill in the art. While high integrity atmospheric sealing is not always a requirement in achieving some degree of atmospheric control, sealed furnace systems are often interchangeably referred to as atmosphere controlled furnaces, at least for the reason that sealing of the furnace chamber tends to facilitate refined approaches to atmosphere control especially when high purity gas is required. A common requirement for atmosphere controlled systems is that the furnace chamber is sealed in a gas tight manner that maintains a very low leak rate (for example leakage between ambient surroundings and the interior of the furnace chamber) below some predetermined rate (for example <10e-4 torr liters per second). Vacuum furnaces may be considered a subset of atmospheric controlled furnaces, and in addition to being sealed, vacuum furnaces tend to be constructed with a high strength housing in order to withstand vacuum pressures in a range of approximately 15 psi negative (vacuum) pressure to 15 psi positive pressure. In this case, total heating to the part can be regarded as being the sum $Q_{total}=Q_{ext}+Q_{int}$. In some embodiments, $Q_{ext}$ can be provided by external heaters with $Q_{int}$ being provided by microwave radiating impinging upon the part.

Figure 2:
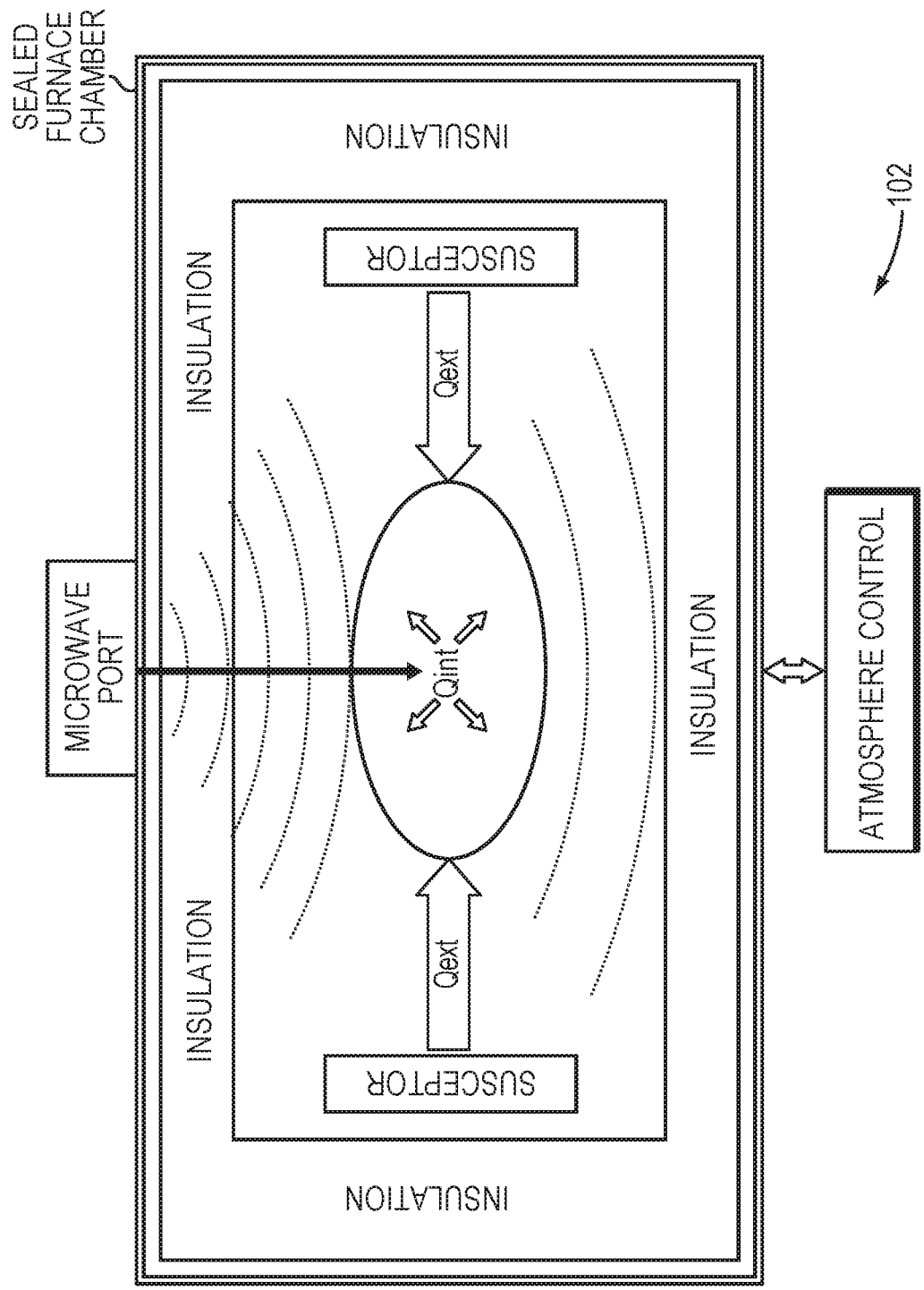
FIG. 2 is a schematic diagram of a conventional microwave only susceptor enhanced furnace.

FIG. 2 illustrates a conventional embodiment of a microwave-only, susceptor-enhanced system 102, which uses no resistive electrical heaters and is configured to provide all of the external heat by way of susceptors. Microwave susceptors can be used to convert microwave power into microwave induced thermal power to provide at least some portion of the external heating $Q_{ext}$.

Conventional embodiments of systems such as that of FIG. 2 can have a number of disadvantages including but not limited to:
1. Microwave-only susceptor enhanced processing tends to require very high level of microwave power and thus high microwave field intensity throughout the whole inside of the furnace chamber. There are a host of well-known secondary problems and challenges associated with high intensity microwaves including but not limited to plasma discharge, arcing, leakage and cost.
2. All or most of $Q_{ext}$ is generated by susception. Thus, it can be extremely difficult to control the relative amount of external ($Q_{ext}$) vs. internal ($Q_{int}$) heating at least because the susceptors and part(s) are both exposed to a common radiation field. Furthermore, for both the part and the susceptors, the complex dielectric constant can vary tremendously and in unknown, unpredictable or otherwise complex ways as a function of temperature. Any such temperature-based variation causes similarly corresponding temperature based variation in the relative amounts of internal vs. external heating of the part.
3. Microwave heating of insulation.
4. There are major practical and commercial challenges that need to be overcome in order to physically support the susceptors in a way that prevents damage to surrounding parts and insulation. Also it can be difficult to prevent thermal runaway at or near the susceptors.
5. Specialized high susceptance materials (i.e., specialized microwave absorbing materials having low real part of dielectric constant real{epsilon}<30 and high imaginary part im{epsilon}>5} tend to be unstable at high temperature and can tend to degrade when subjected to extreme high temperature. It is generally considered extremely challenging to design high susceptance materials for long life and reliability.
6. This approach (microwave only susceptor enhanced) is inherently inflexible with respect to part size, part shape, material of part, and number of parts per batch. Typically, for any given part or group of parts, it is necessary to experiment with different arrangements of parts and susceptors in order to achieve high quality results.

In regard to item number 6 above, with respect to sintering of metal, there have been limited application-specific successes based on conventional microwave-only susceptor enhanced furnaces, these systems tend to be applicable to limited customized process application for some specific part. This approach can be perfected in certain limited cases typically based on extremely large time investments in customized and highly application specific process development. At least because of this application specific nature of past work, conventional furnaces that use this approach do not provide a flexible tool for handling a wide variety of materials and parts. There is no clear way to introduce heat spreading—as will be described below heat spreading can provide a powerful approach to providing a furnace that is flexible with regard to part size and shape and number of parts per batch.

Regarding item 2 above, the difficulty associated with any attempt to predict and/or control the relative degree of internal vs. external heating is a significant obstacle in microwave-only susceptor enhanced furnaces. The difficulty of controlling the balance between internal and external heat being an impediment to flexibility and practicality, and other disadvantages associated with this approach, prevents conventional microwave-only susceptor enhanced systems and/or methods from being a commercially viable solutions for processing a wide variety of parts having various characteristics (e.g., materials, sizes, or quantities).

Figure 3:
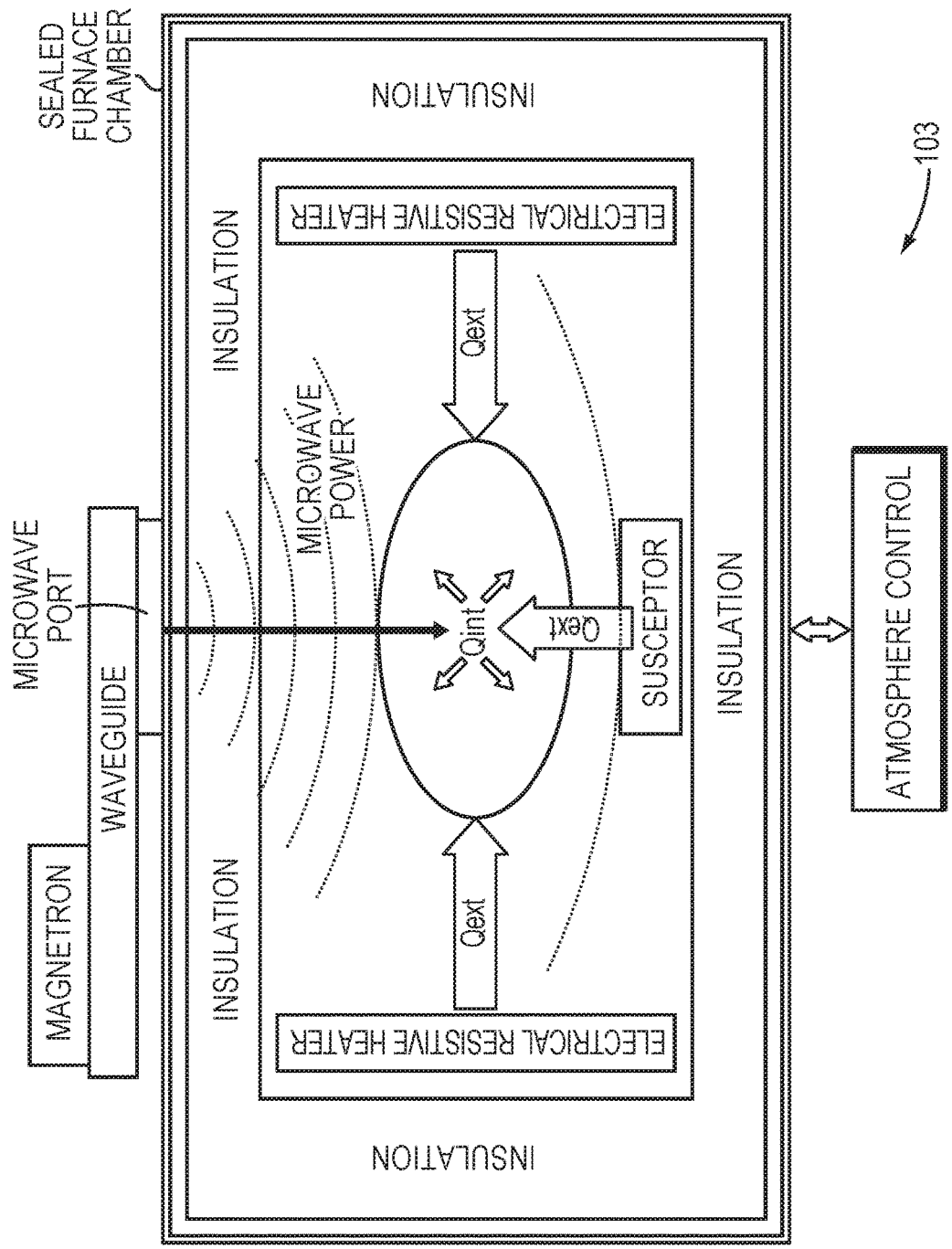
FIG. 3 is a schematic diagram of a conventional microwave-electric furnace with a susceptor.

FIG. 3 shows an embodiment of a conventional microwave-electric hybrid processing system 103 with which external heat can be conveyed to the part by a combination of electrical heating elements and susceptors. An otherwise conventional furnace, utilizing conventional electrically resistive heating elements, is connected by way of a waveguide to a high-power microwave source such as a magnetron in a similar manner to the conventional system of FIG. 1. In addition, a susceptor arrangement is included in the system of FIG. 3.

As can be the case in the system of FIG. 1, the conventional approach of FIG. 3 can facilitate separate and independent adjustment for controllably balancing $Q_{int}$ vs $Q_{ext}$, and thus can at least to some extent address item two in the above list of microwave-only susceptor enhanced disadvantages. However, conventional microwave-electric hybrid furnaces such as that of FIG. 3 and FIG. 1 nevertheless exhibit a number of disadvantages that have inhibited widespread use of such systems and methods. For example, any microwave power radiating into the furnace chamber of FIG. 3 will tend to impinge upon and interact with all or most of the insulation in the chamber. Even specialized insulations (i.e., high grade high purity alumina insulation) can exhibit microwave loss tangent greater than tan delta~0.01 at elevated temperatures, which can lead to greater than 10% loss of a given amount of microwave power coupled into the furnace chamber.

Furthermore, any presence of electrically conductive (or otherwise microwave interactive and/or lossy) impurities within the insulation, for example contaminants introduced during processing, can result in increased localized microwave losses, and these localized losses can create microwave induced hot spots that can tend to be unstable with respect to continued exposure to high power microwaves. This can produce highly disruptive and/or destructive thermal runaway cycles in which even a single hot spot can create a localized overtemperature which increases microwave susceptance in that localized zone which then results yet more heat such causing the extent of the hot spot to physically expand in an unstable and unstoppable way.

Another disadvantage of conventional microwave-electric hybrid units is that the resistive electrical heaters tend to be interactive with microwave power at least to the extent that resistive materials can tend to suscept. Addressing this consideration may limit any choice of heaters to the point where the overall system cannot readily be made in a cost-effective way. Also, the sealed electrical heater feedthroughs (through the furnace chamber wall) tend to cause microwave leaks. Yet further, any sharp metal corners or rough surfaces, such as weld joints can tend to cause arcing and plasma responsive to high power microwaves.

It is noted that systems and techniques associated with all extreme temperature (i.e., >900 C) furnaces—including conventional approaches just described and advanced approaches to be described below—can be challenging to implement for a variety of reasons. Many of the challenges can be practical in nature. As an example of one challenge, at temperatures well above 1000 C there are only a small number of materials (for example graphite, Silicon Carbide, ceramics such as Aluminum Oxide, molybdenum, and Platinum) that are at least generally stable and viable for use as structural and otherwise functional elements at such high temperatures. Therefore, designers of high temperature metal processing furnaces must select among a highly limited number of materials with which to design build. Furthermore, at elevated processing temperatures (i.e., above 1000 C) even specialty high temperature materials can degrade through interactions with surrounding gases and/or any other materials that they come into contact with. In general, even for the limited number of materials that can survive at all above 1000 C, structural/mechanical performance and other material properties tends at best to be compromised relative to structural/mechanical performance and material properties at more modest temperatures. For many materials, such as Molybdenum, the performance can be marginal to the point of being barely viable only for relatively short component lifetime.

Figure 4:
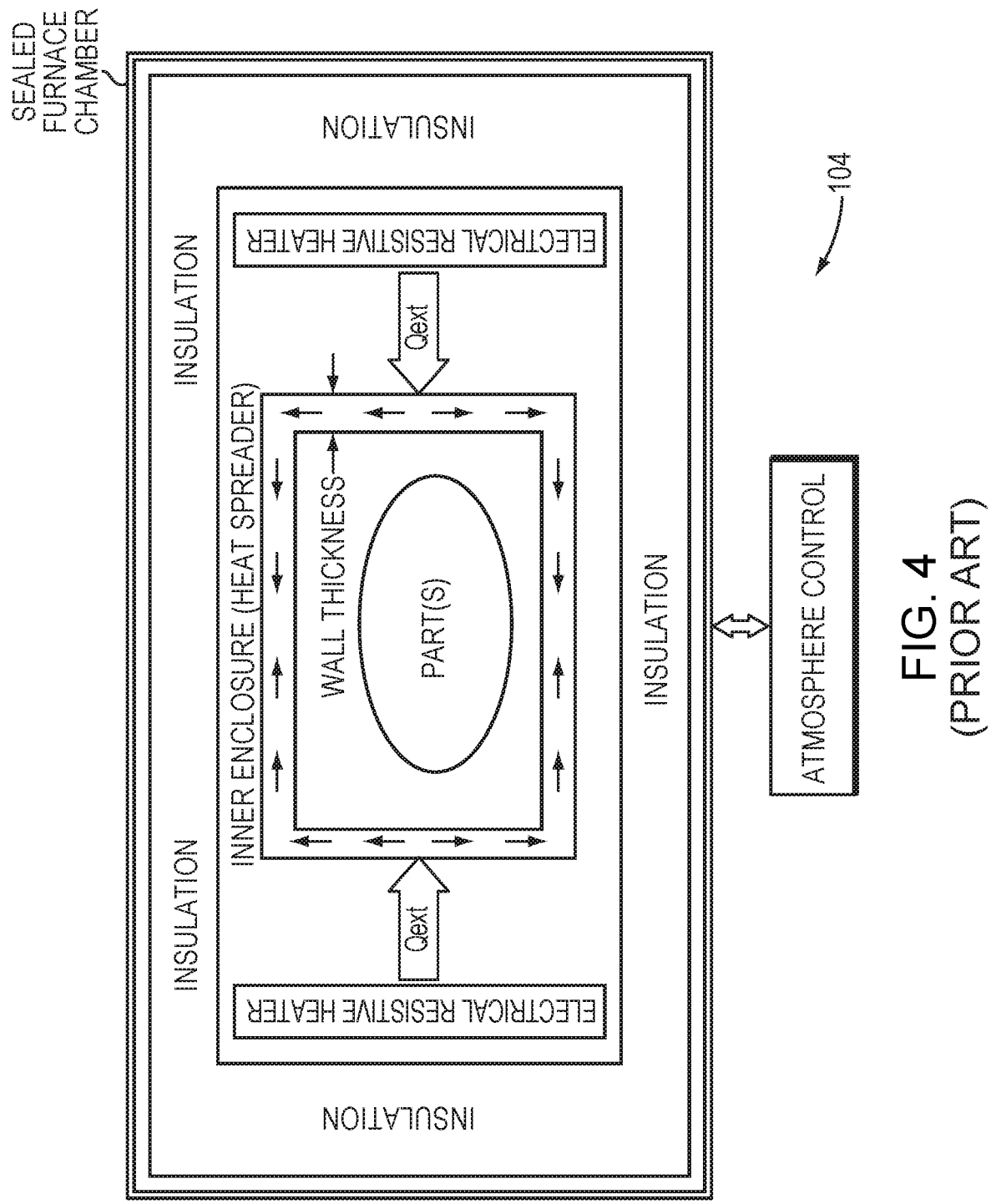
FIG. 4 is a schematic diagram of a conventional furnace with a heat-spreading inner enclosure.

FIG. 4 illustrates a conventional furnace 104 including a head-spreading inner enclosure. Having introduced several conventional approaches to hybrid and susceptor based microwave systems and methods, various further aspects of traditional furnaces will be brought to light for explanatory purposes. The conventional furnace system of FIG. 4 includes a centrally located inner enclosure arranged within a peripheral envelope defined by the heater elements, and surrounded by thermal insulation, such that the inner enclosure delimits a processing volume as a centrally located volumetric region in which one or more parts can be placed for thermal processing. In addition to delimiting this region, and providing a volumetric space for placement of parts, the inner enclosure can be configured to serve as a heat spreading enclosure to enhance spatial temperature uniformity within that volumetric region. In some embodiments, the inner enclosure can be constructed of graphite walls having sufficient thickness (for example ⅜-¾ inch wall thickness) such that heat can flow tangentially within the walls, by way of thermal conduction as indicated by arrows in FIG. 4, in a manner that at least partially compensates for a given degree of non-uniformity in radiative and/or conductive heating provided by the heater elements. In many applications, this heat conduction and heat spreading performance can be sufficiently crucial that an absence of such heat spreading can result in deformed or otherwise comprised parts. In many embodiments, the inner enclosure can be interchangeably referred to as a heat spreading enclosure, especially in embodiments wherein thermal conductivity of the walls contributes to more uniform temperature distribution than would otherwise be the case if the furnace liner were removed.

The configuration of FIG. 4 may advantageously address several aspects related to flexibility with respect to part size, shape and number of parts per batch. Uniform heat distribution can be a crucial requirement for any furnace that is intended for general purpose processing especially with regard to variations in part size, shape and number of parts per batch. The use of a heat spreading inner enclosure tends to facilitate flexibility with respect to these issues.

In example embodiments, a sintering furnace can be configured for processing an object, by providing a furnace chamber enclosing an arrangement of insulating material that exhibits high thermal resistivity and can be configured to define an inner volumetric hot region that is centrally disposed in the chamber such that the inner hot region surrounded in all directions by the insulation. The inner hot region can be configured to receive at least one object to be processed. For example, the object may be a pre-processed part. A plurality of magnetrons can be provided and configured to controllably produce microwave power, and to direct that microwave power through the insulation to the inner hot region. A susceptor arrangement can be disposed within the inner enclosure and configured to absorb at least a portion of the microwave power and to convert that portion to an amount of microwave induced thermal power to elevate the temperature within the inner enclosure based at least in part on a cooperative balance between the microwave induced thermal power and the thermal resistivity of the insulating material.

Having described conventional furnaces that incorporate microwaves, attention is drawn to various further aspects of microwave processing. Microwave ovens and other traditional microwave cavity applicators generally rely on the use of electrically conductive metal walls to contain microwaves within a well-defined spatial heating zone. In some cases, such as microwave ovens, metal walls can be configured to form a solid rectangular cavity having length width and height that each span an integral number of half wavelengths for the operating frequency associated with a given high power microwave source. In other applications microwaves can be introduced by way of non-resonant applicators using techniques that are familiar to those skilled in microwave processing. For example, well known microwave based powder drying systems can utilize microwave applicators by way of distributed waveguide antennas that are arranged to irradiate a powder as it is conveyed beneath the antennae. In these systems, metal walls may be used to reflectively contain the microwaves at least for purposes of safety, but there is often no requirement that this microwave reflective containment structure be employed as a resonant cavity.

Example embodiments described herein include methods and systems whereby aspects of heat spreading inner enclosures are combined with aspects of conventional microwave processing whereby a heat spreading inner enclosure provides a third functionality as part of a microwave applicator for providing microwave radiation to parts disposed therein. As will be described in greater detail hereinafter, these systems and methods can be utilized to provide for internal heating based on microwave radiation in conjunction with external heating from electrically resistive heating elements. As noted above, the practical challenges inherent in high temperature (>900 C) furnace designs are well known and extremely limiting especially in view of reasonable practical limitations such as cost, power budget, size and weight. The systems and methods described below overcome these limitations in a manner that provides sweeping advances over conventional approaches to implementing hybrid-microwave thermal processing. For example, the systems and methods below provide for microwave-electric hybrid furnaces that can be highly flexible with respect to part size, geometry and number of parts per batch.

As will be described at various points herein, the use of heat spreaders may provide substantial advantages, especially with regard to flexibility to process parts of various sizes, shapes and number (i.e., number in each batch). Further, for sintering of metal parts, the use of high performance heat spreaders can be yet more advantageous in order to provide for uniform shrinkage and therefore high precision of fully sintered parts. For example, a high-performance heat spreader may be provided as a heat-spreading enclosure constructed as a graphite box having ⅝" thick walls. An inner enclosure of this construction can be cooperatively configured with heaters and insulation to achieve temperature uniformity of less than 5 C throughout the inner enclosure.

A heat-spreading enclosure suitable for high temperature processing (e.g., at 1200 C to 2000 C) can be configured to exhibit sufficiently high electrical conductivity to reflectively contain microwave radiation in a manner that is at least generally to similar metal containment structures.

Figure 5:
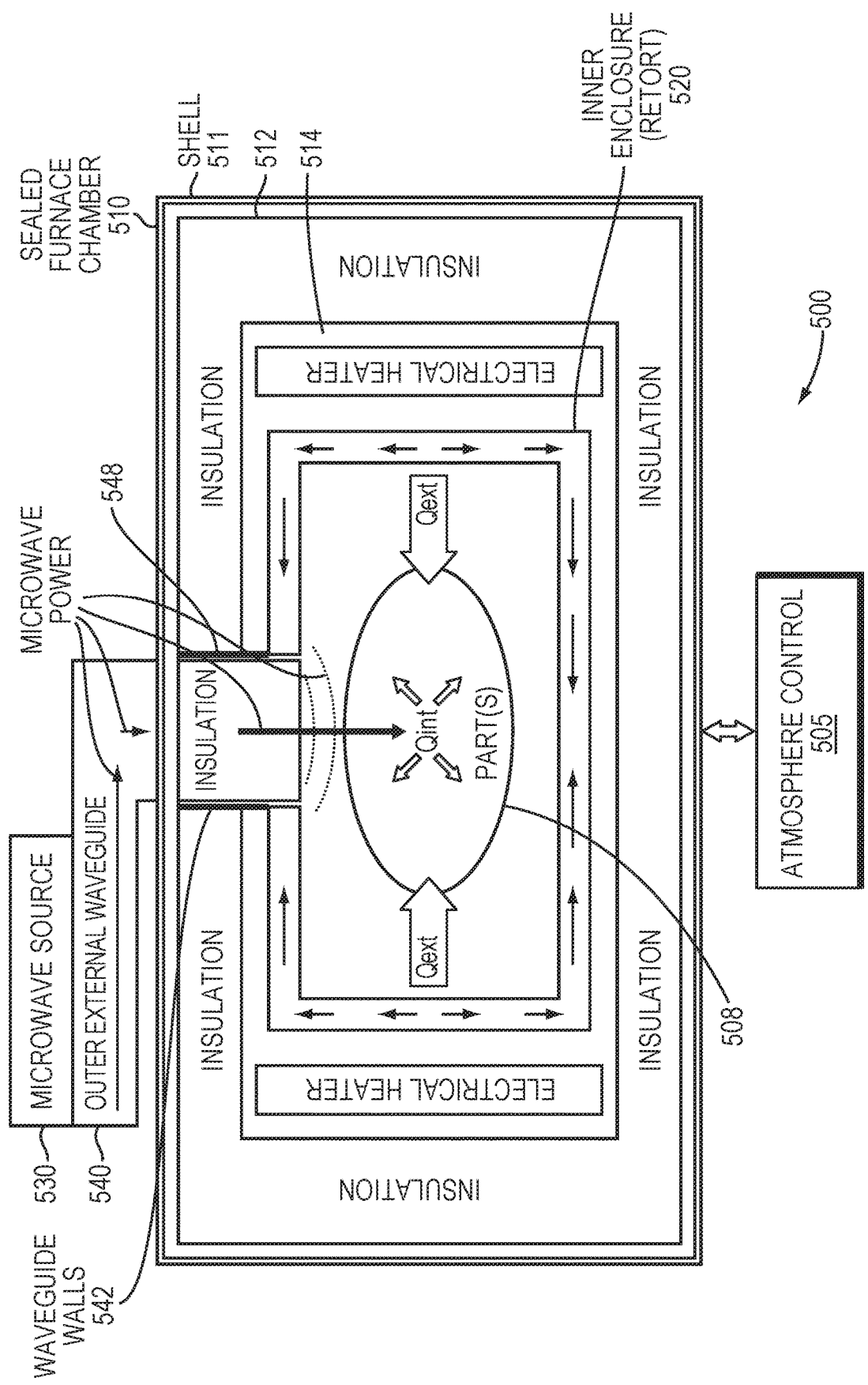
FIG. 5 a schematic diagram of a microwave-electric furnace with a heat spreading inner enclosure.

FIG. 5 illustrates a high-temperature processing furnace 500 in an example embodiment. The furnace may include a furnace chamber 510 in gaseous communication with an atmosphere control system 505. The furnace chamber 510 may include an outer shell 511 encompassing an insulation layer 512, which, in turn, surrounds a working volume into which a part (or parts) 508 is placed for thermal processing. Electrical heating elements 514, in combination with a microwave source 530, may provide heat to the part 508. An inner enclosure 520 (also referred to as a retort or retort assembly) can serve as a heat spreader as described in the context of the furnace 104 of FIG. 4. In the furnace 500, in contrast, the inner enclosure 520 can also serve the additional role of microwave applicator (in this case a cavity-type applicator). A waveguide 540 directs microwave radiation from the microwave source into the working volume, which may be encompassed by the inner enclosure 520. The waveguide 540 may be configured as a selected one of a rectangular waveguide, a circular waveguide or a coaxial transmission line. The inner enclosure 520 can be configured with appropriate dimensions for acting as a resonant microwave cavity. However, this is not a requirement, and in various embodiments the enclosure can be configured as a non-resonant microwave applicator. Thus, the inner enclosure 520 may be referred to as a microwave applicator. The electrical conductivity of graphite is sufficiently high such that a graphite enclosure having appropriate shape (e.g., rectangular solid) and appropriate dimensions (e.g., integral half wavelengths in all three directions) can be configured to act as a microwave applicator, resonant or otherwise, having comparable properties with respect to containing and applying microwaves that one can generally expect from traditional metal-walled applicators. Alternatively, the inner enclosure 520 may be formed of carbon-containing materials other than graphite, such as carbon-carbon composites, chopped fiber carbon materials, or other carbon containing, high-temperature materials.

Referring again to FIG. 5, the waveguide 540 can be considered as being generally divided into two separate sections: an external waveguide located outside the furnace chamber, and an internal waveguide that is inside the furnace chamber and extends through the furnace insulation. A volume within the internal waveguide may include furnace insulation 548, which may be advantageous at least for thermally insulating against radiative heat that would otherwise tend to radiate from the internal enclosure. This insulation may be selected as being one that is highly transmissive to microwave propagation. In alternative embodiments, the microwave source 530 may be located within the furnace chamber 510, and the waveguide 540 may comprise only an internal waveguide.

Waveguides may require the use of electrically conductive materials. In general, most electrically conductive materials tend also to be thermally conductive, so the introduction of an internal waveguide may cause heat loss. Indeed, the above-described challenges for designing systems for operation at extreme high temperatures tend to prohibit the use of conventional metal waveguides inside the furnace chamber. Conventional metal waveguides would tend to melt, and even in the absence of melting, the heat load would tend to be excessively high. For example, if the waveguide were fabricated from thick-walled molybdenum (e.g., $1/16^{th}$ of inch or greater), then the heat load from the inner enclosure to the furnace chamber wall would be well beyond what may generally be practical in a commercial and/or industrial grade furnace.

Figure 6:
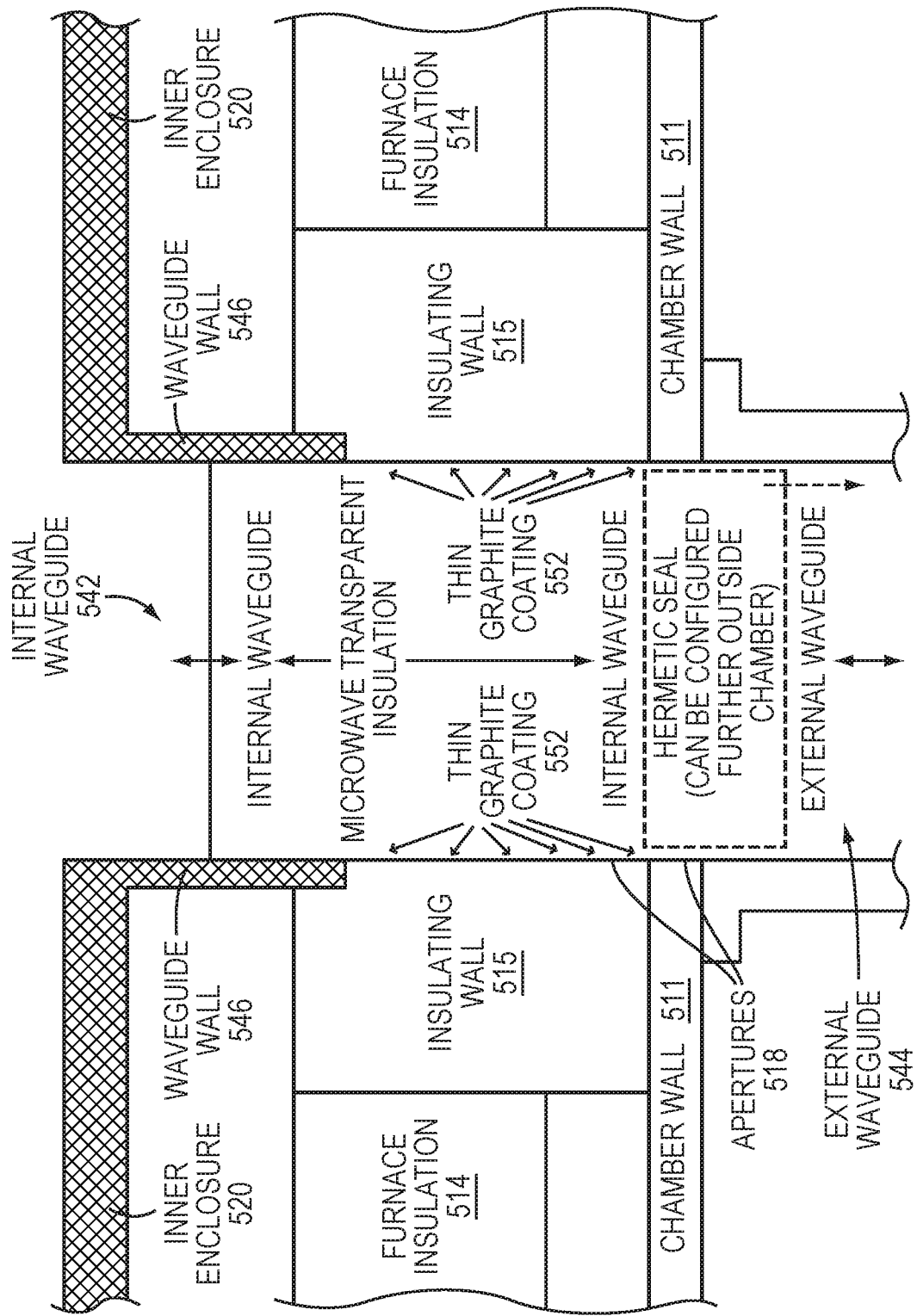
FIG. 6 illustrates an internal waveguide used in connection with the Furnace of FIG. 5.

FIG. 6 illustrates one embodiment of an internal waveguide 542 (e.g., a component of the waveguide 540) that can be implemented in the furnace 500 of FIG. 5, and that provides sufficient electrical conductivity for serving as a waveguide, while providing sufficiently low thermal conductivity to allow for a practical and commercially viable system. As noted above, conventional metal waveguides would tend to melt and would also tend to conduct unacceptable amounts of heat from the inner hot zone to the furnace chamber. The furnace 500 may address these concerns by providing for sufficiently high electrical conductivity while maintaining sufficiently low thermal conductivity.

The internal waveguide 542 may connect with an external waveguide 544 via apertures 518 in the chamber wall 511 and insulation layer 514. To maintain heat within the furnace chamber 510, an insulating wall 515 (composed of, e.g., graphite or another carbon-containing material with sufficient electrical conductivity for reflecting microwaves) may be positioned at the junction of the insulation layer 514 and the waveguide 542, and may make up a portion of the interior surface of the waveguide 542. Further, an insulation 548 that is substantially transparent to microwave radiation may occupy some or all of the internal volume of the internal waveguide 542 (and particularly the volume adjacent to the insulating wall 515), thereby maintaining heat within the working volume while passing the microwave radiation. A waveguide wall 546 connects the internal waveguide 542 to the inner enclosure 520. To direct the microwave radiation through the waveguide, the interior surface of the waveguide 542 including the surface of the insulating wall 515 and/or waveguide wall 516) may be coated with a coating 552 that is reflective to microwave radiation (e.g., a graphite coating or another carbon-based material with sufficient electrical conductivity for reflecting microwaves). Various elements of the internal waveguide 542 and external waveguide 544, such as the walls and/or interior wall surfaces, may be composed of graphite or other carbon-containing materials, such as carbon-carbon composites, chopped fiber carbon materials, or other carbon containing, high-temperature materials. Note that for any embodiment that uses thin layer of graphite for reflecting microwaves then it may be advantageous that the underlying insulation wall be a graphite based. However this should not be construed as limited and other underlying insulating materials can be employed as an insulation wall that supports the thin layer and provides thermal insulation as required.

Figure 7:
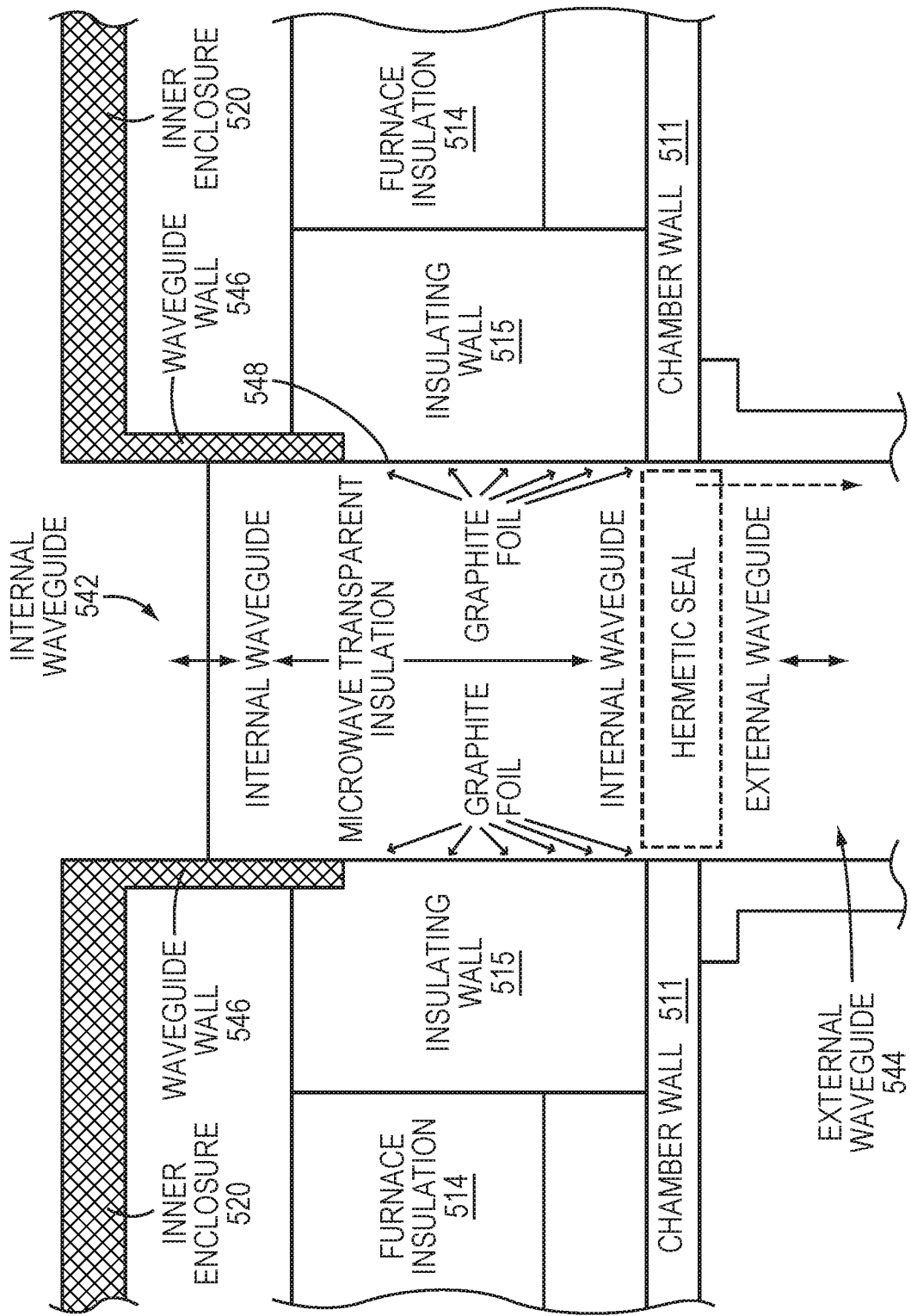
FIG. 7 illustrates an alternative internal waveguide used in connection with the Furnace of FIG. 5.

FIG. 7 illustrates another embodiment of an internal waveguide for use in the system of FIG. 5, similar to the embodiment of FIG. 6, wherein thin graphite foil is used in place of the graphite coating. Graphite foil is available in thin sheet 0.005" thick and can be readily bonded to graphite fiber furnace insulation. Note that for any embodiment that uses thin layer of graphite for reflecting microwaves then it may be advantageous that the underlying insulation wall be a graphite based. However this should not be construed as limited and other underlying insulating materials can be employed as an insulation wall that supports the thin layer and provides thermal insulation as required.

Figure 8:
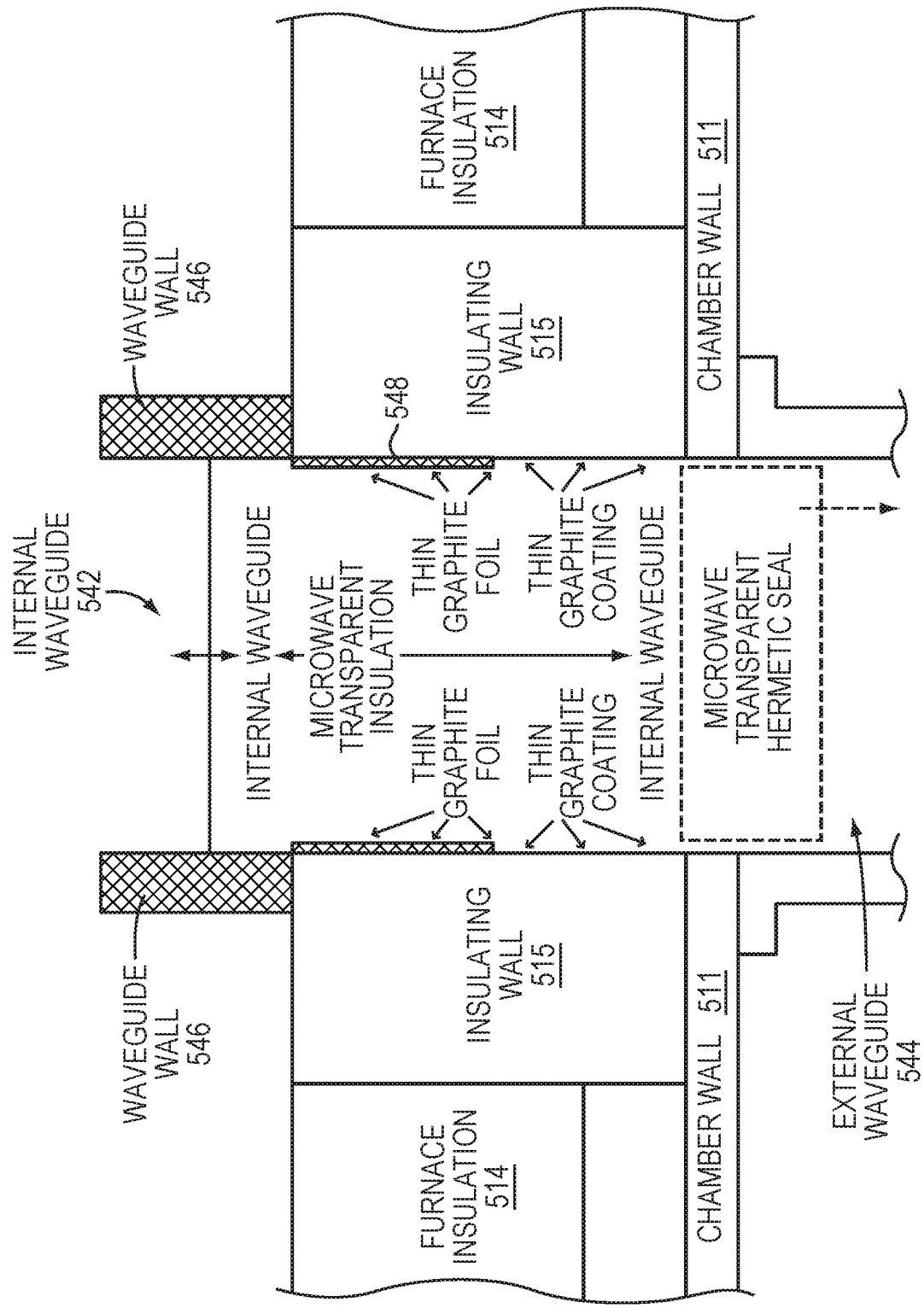
FIG. 8 illustrates an alternative internal waveguide used in connection with the Furnace of FIG. 5.

FIG. 8 illustrates yet another embodiment, applicable to the FIG. 5 embodiment, of an internal waveguide that includes aspects and features common to those of FIGS. 6 and 7. Here, a graphite foil may be employed in surfaces of the internal waveguide that are on the hotter side. This foil can be configured to be more robust with respect to heat damage as compared to the foil. On the other hand, the graphite foil can tend to exhibit lower thermal resistance (material property describing resistance to heat flow, the inverse of thermal conductivity) which tends to increase undesirable heat loading. A designer employing this embodiment may be motivated to minimize the extent of internal waveguide that is covered with foil.

Figure 9:
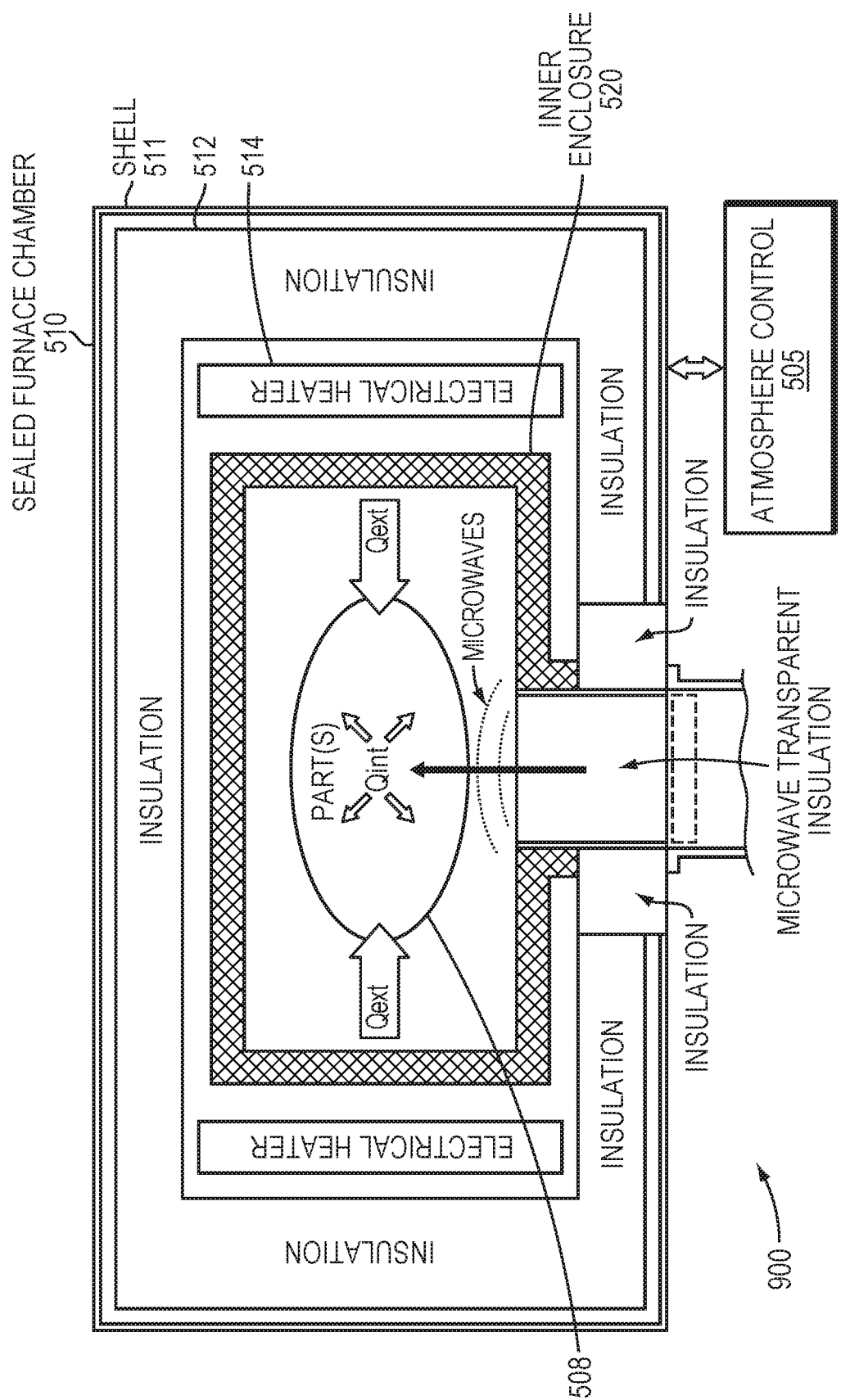
FIG. 9 is a schematic diagram of an alternative microwave-electric furnace with a heat spreading inner enclosure.

FIG. 9 illustrates a furnace 900 in an embodiment that combines various features of previous embodiments including the furnace 500 of FIG. 5 and the waveguides of FIGS. 6-8. It is noted that the orientation is different than that of FIG. 5 to the extent that the waveguide feed is introduced from the bottom of the furnace rather than the top.

Figure 10:
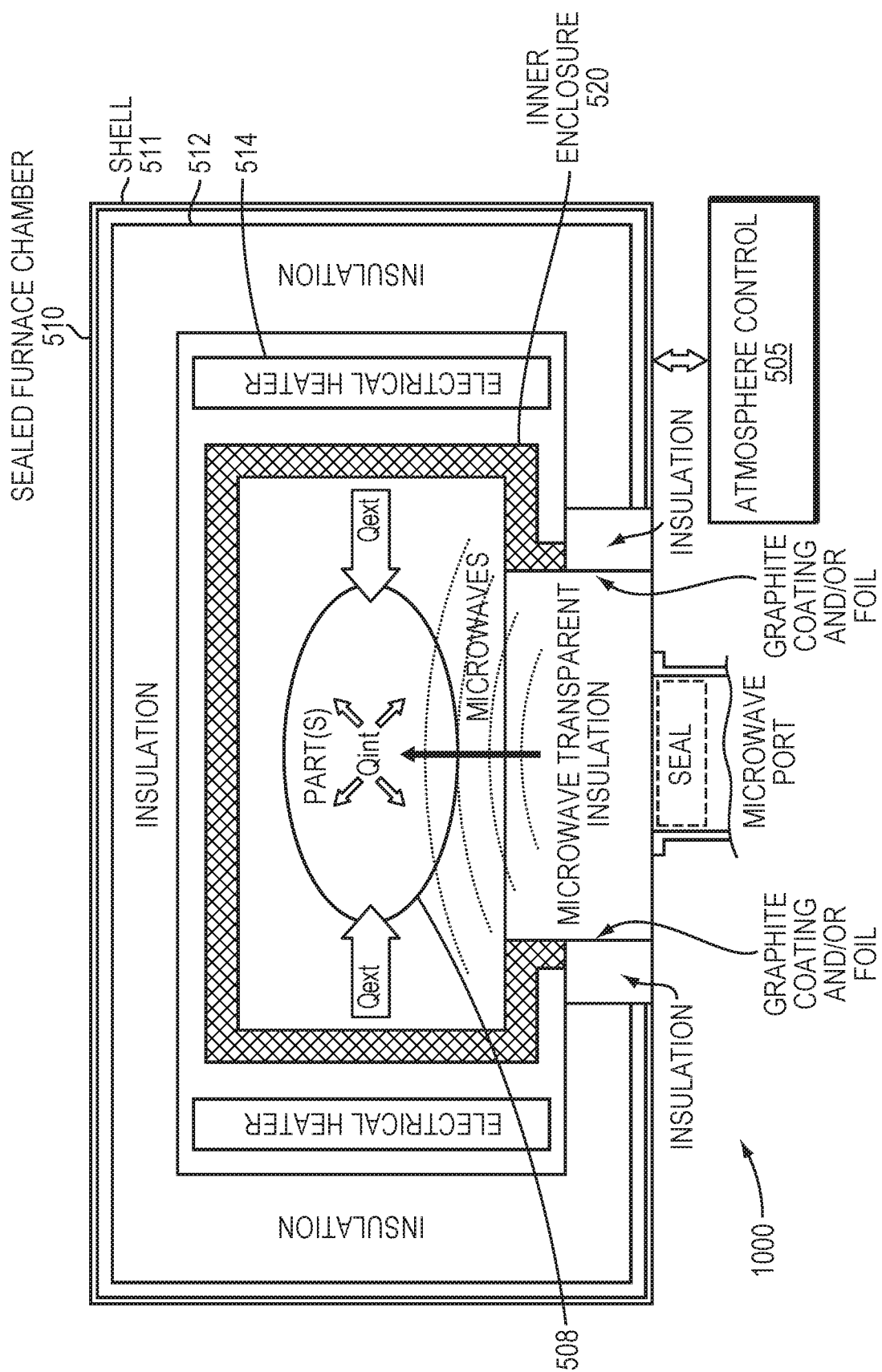
FIG. 10 is a schematic diagram of an alternative microwave-electric furnace with a heat spreading inner enclosure.

FIG. 10 illustrates a furnace 1000 in an embodiment wherein the internal waveguide is sufficiently large that with respect to microwave properties and performance it can be regarded as an extension of the inner enclosure. This approach can tend to increase the heat load at least because the perimeter of the conductive layer is larger and thus has a larger circumference. It is noted that a designer implementing this embodiment can be motivated to use very thin coatings in order to mitigate heat loading. It is further noted, as will be described in detail below, that this approach may tend to facilitate greater spatial uniformity with of microwave power including within the heat spreading inner enclosure. There are at least two ways in which this uniformity can be enhanced including (i) this embodiment allows for a mode stirring arrangement as part of the microwave port. For example, a mode stirring rotating patch antenna (sometimes referred to as a mode stirring "flag") can be provided as part of the microwave port arrangement.

Figure 11:
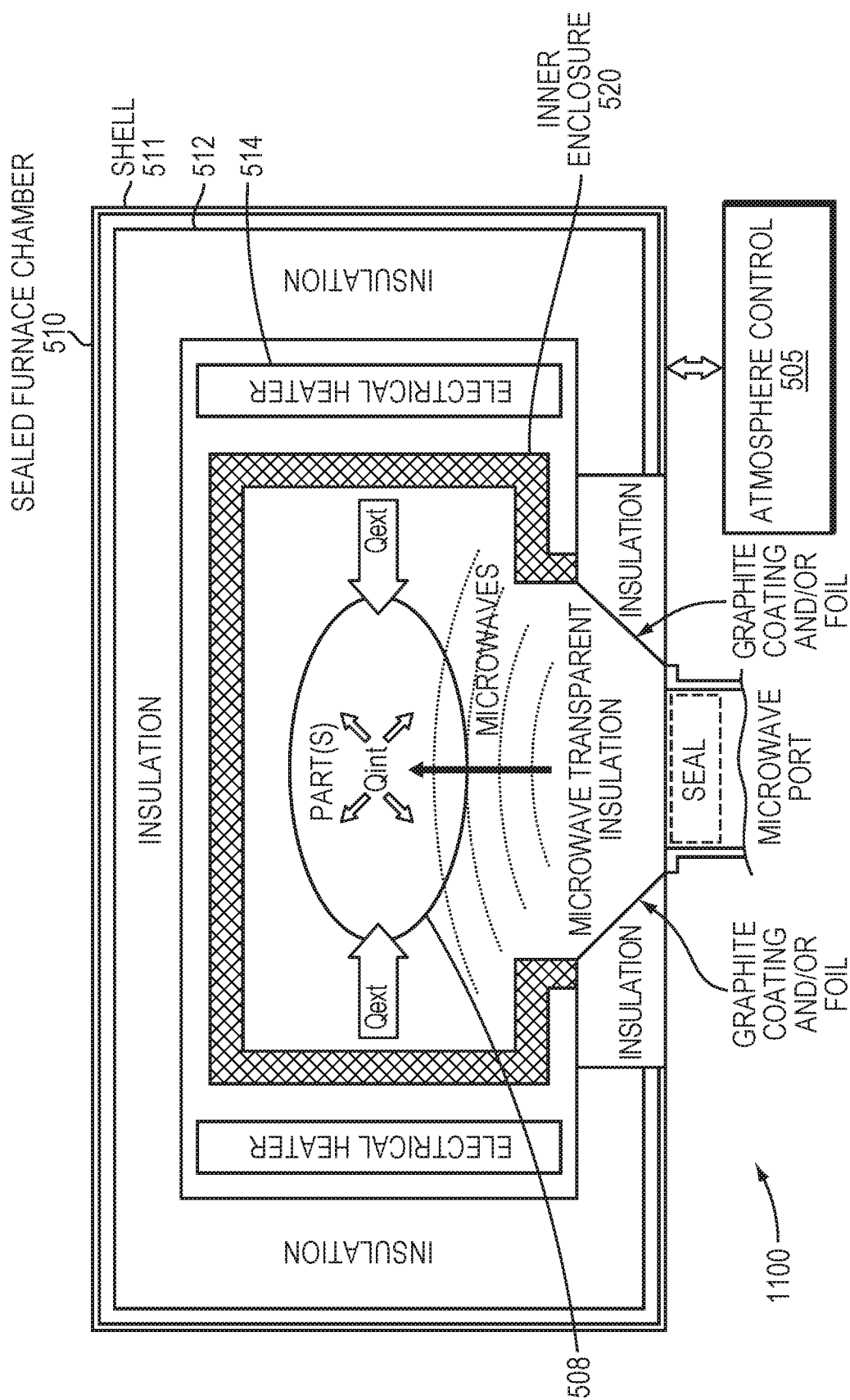
FIG. 11 is a schematic diagram of an alternative microwave-electric furnace with a heat spreading inner enclosure.

FIG. 11 illustrates a furnace 1100 in an embodiment wherein the internal waveguide is tapered to serve as a microwave horn. This embodiment can be arranged as a balanced compromise between the FIG. 10 embodiment and the FIG. 9 embodiment. The embodiment of FIG. 10 is compatible with mode stirring microwave port to facilitate enhanced spatial uniformity of microwave power, and the FIG. 9 embodiment can reduce heat loading by somewhat restricting to some extent the heat load path.

Figure 12:
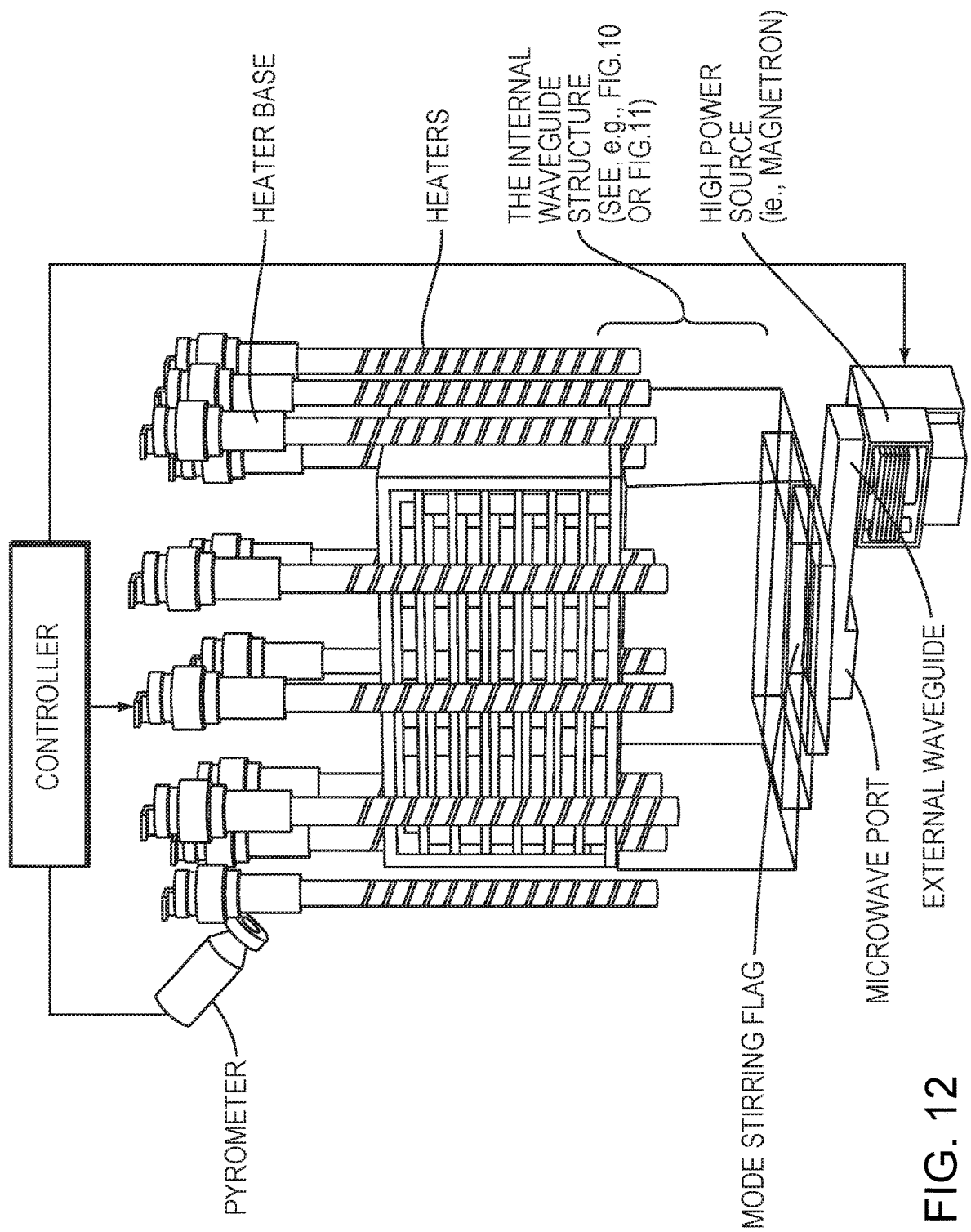
FIG. 12 is a schematic diagram of an alternative microwave-electric furnace with a heat spreading inner enclosure.

FIG. 12 illustrates aspects of implementation that can be applied to the embodiments including (but not limited to) the embodiments of FIG. 10 and FIG. 11. As described above, a mode stirring flag can be included in part to provide for enhanced uniformity of microwave field intensity within the inner heat spreading enclosure. In some embodiments, each heater can be mounted with its heater base embedded in and supported by a slab of insulation (insulation not shown).

With respect to the embodiments of FIGS. 7-13, structures and methods are described that simultaneously address the requirement for high electrical conductivity and high thermal resistance with respect to the conducting surface of the internal waveguide. As mentioned previously, conventional metal waveguides cannot reasonably be utilized for guiding microwaves from the chamber wall to the inner enclosure. Even if expensive specialty metals such as molybdenum and tungsten were utilized, the resulting heat load can tend to be so high as to render the system utterly impractical at least for any kind of cost effective commercial use.

Various carbon-based materials may have sufficiently high electrical conductivity for serving as waveguides, and sufficiently low thermal conductivity for avoiding excessive heat loading and for maintaining heat loading within acceptable limits. In one example, a thin graphite foil can be used as a waveguide wall in the inner waveguides of the various embodiments. This graphite foil can be bonded to surrounding graphite insulation around the outside of the inner waveguide. Inside the inner waveguide microwave transmissive (i.e., low dielectric loss insulation), such as alumina insulation, can be employed. Graphite foil, bondably laminated to a substrate of graphite insulation, can be considered to have a tremendous advantage of being highly robust with respect to peeling, cracking, and other mechanical degradations.

In another aspect, thin coating of graphite can be applied to the surrounding graphite insulation. Various graphite coatings are available and are utilized in the furnace insulation for furnaces that operate as high as 2000 C. While peeling and degradation is a known challenge at the upper end of extreme temperatures (i.e., 2000 C), it is believed that at least some commercial grade graphite coatings will maintain sufficient integrity at temperatures below 1500 C. Thus, for temperatures below 1500 C graphite coatings can be considered as a viable approach to fabricating the internal waveguide. The use of graphite coatings can be potentially advantageous as an alternative to the use of graphite foil at least for the reasons that it is easier and hence can be less costly to apply and can be made thinner for achieving higher thermal resistance while maintaining sufficiently high electrical conductivity. The latter of these advantages, higher thermal resistance with sufficient electrical conductivity, may be particularly beneficial in given applications.

In another aspect, graphite foil can be used to line a portion of an internal waveguide, as shown in FIG. 8, and coating can be applied to the other portion. It is noted that this combined approach (using a thin coating for one portion and foil overlayer for another) is applicable to various embodiments including but not limited to those of FIG. 9, FIG. 10 and FIG. 11. This approach can combine the advantages (tougher and less prone to peeling) of graphite foil, with the advantages of graphite coatings (higher thermal resistance with sufficient electrical conductivity). This combination can be especially desirable insofar as the foregoing two advantages are each brought to bear where they are needed most; one the hot side peeling is most likely to occur, and on the cold side higher thermal resistance is especially desired.

It can be advantageous to include two microwave seals one at the cold end and another at the hot end of the waveguide. The microwave seals can be desired for a variety of reasons including but not limited to: (i) inhibiting microwave radiation into the outer portion of the furnace where the electrical heaters, insulation, and other features are present. (ii) providing a high degree of electrical continuity as is generally required for seams and joints in waveguides as well as in resonant cavities. Electrical continuity can be a ubiquitous requirement with regard to surfaces, joints and seams that are disposed throughout a given waveguide and/or applicator system.

Figure 13:
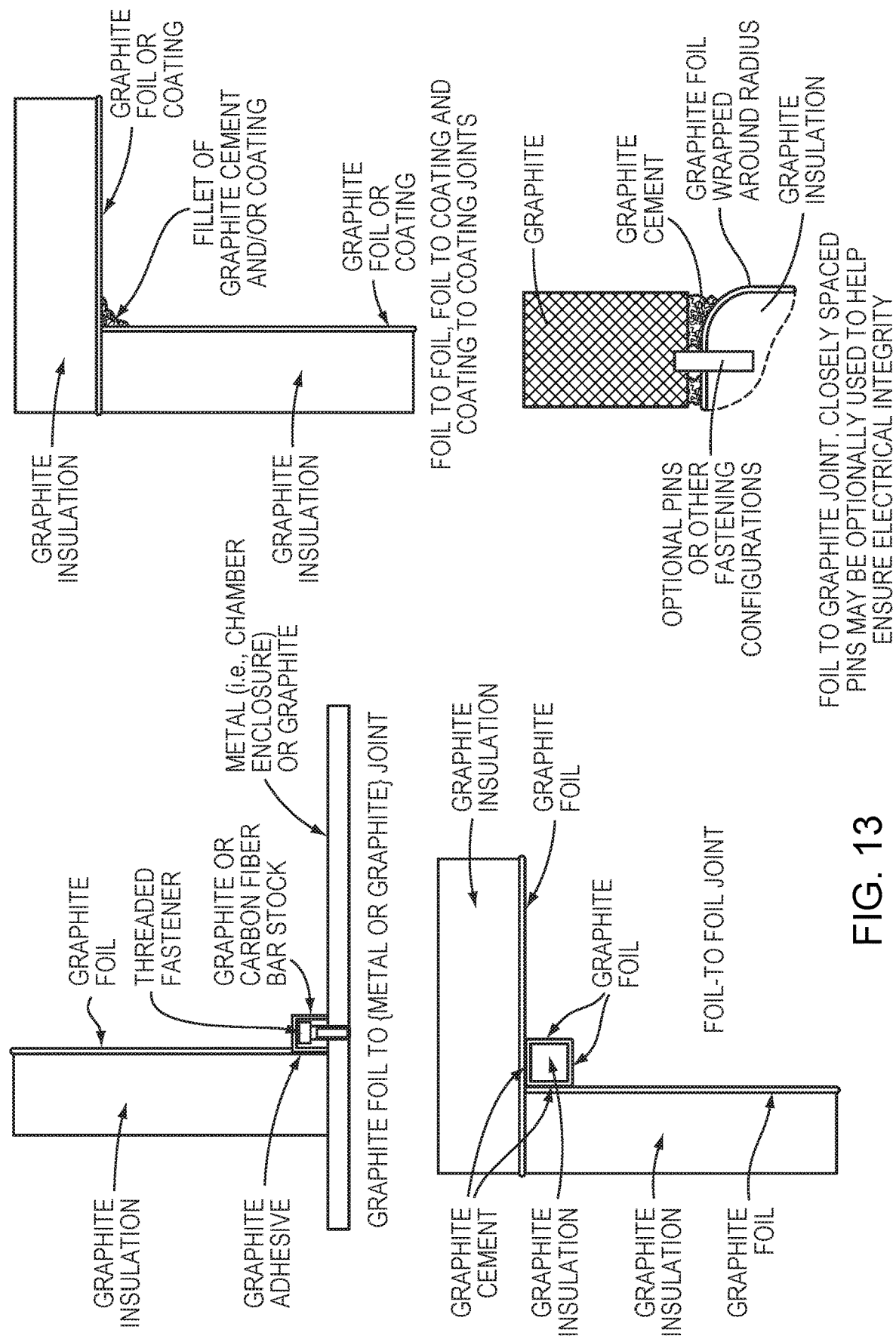
FIG. 13 illustrates a number of approaches for addressing microwave-compatible joints and that form attachments between various components of the previously described embodiments.

FIG. 13 illustrates a number of approaches for addressing microwave-compatible joints and that form attachments between various components of the previously described embodiments. This is by no means a complete list of options, but is intended to draw attention to the potential need to ensure good electrical continuity across various joints and to do so in way that is compatible with extreme high temperature. The microwave sealing and attachment embodiments in FIG. 13 at least provides some approaches for addressing this challenge in a manner that is believed to be reasonably practical. Though not illustrated, it is noted that high integrity electrical connections can be formed in graphite to graphite bonds by forming butt joints that are cemented using graphite cement. It is to be understood that in many cases thin graphite coatings can be interchangeable with graphite foil layers. Furthermore, these descriptions are not intended as being limited in this regard and there may be other carbon based materials having sufficiently high electrical conductivity be used as a microwave reflective layer.

It is noted that the atmosphere control system of various embodiments can be arranged in virtually an unlimited number of variations depending on materials to be processed and a multitude of other considerations well knows to experts in metal sintering and other high temperature processing technologies. A person skilled in the art of high temperature-processing furnaces can contemplate numerous variations for facilitating atmospheric control that can be arranged to be compatible with the systems and methods described here.

Figure 14:
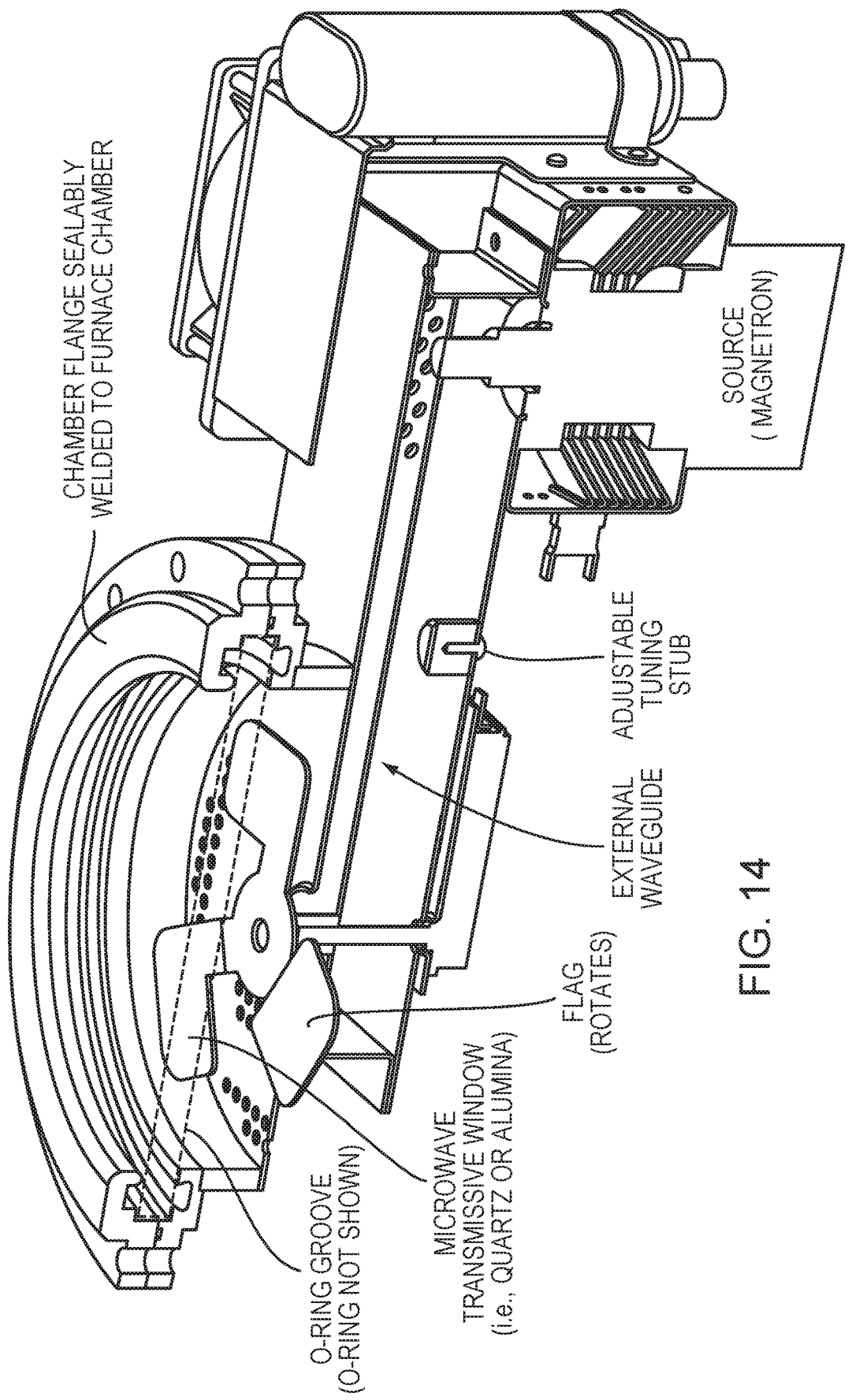
FIG. 14 illustrates various details with respect to a microwave power feed that includes a microwave port, an external waveguide, and a magnetron.

FIG. 14 illustrates various details with respect to a microwave power feed that includes a microwave port, an external waveguide, and a magnetron. The illustrated feed can be utilized in various ones of the described embodiments. As described previously, various ones of the described embodiments (for example the FIG. 10 and FIG. 11 embodiments) can benefit from the use of a microwave port that is configured for "mode stirring". Mode stirring can be thought of as rotatably steering microwave radiation in different directions in a manner analogous to rotating or sweeping spotlight or searchlight. The configuration of FIG. 14 utilizes a "flag" that includes three patch antennas at different height form a ground plane. Based on principles known to a person of ordinary skill in the art, various features of the entire rotating assembly including the shaft, the coaxial hole of the shaft connecting the waveguide to the flag, and patch antennas of the flag itself can be cooperatively configured for achieving an acceptable threshold impedance matching at least in order to promote forward coupling of microwave power and to minimize backward reflection of microwave power back to the magnetron or whatever power source is being utilized. Also, based on well-known practice, tuning stubs can be adjustably incorporated within the external waveguide and positioned in such a way as to provide impedance matching between the magnetron and the overall load. The overall load can be influenced by various structures and objects, including parts that are within the microwave envelope inside the furnace chamber. (By microwave envelope we mean any structure part or object that is in microwave communication with the microwave port and/or waveguide feeds that provide microwave power to the inner enclosure. Parts that are within the microwave enclosure are considered to be within the microwave envelope, as is anything else that is exposed to microwave radiating within the overall system. Structures and features that are isolated, for example lying outside the inner enclosure and/or outside the conductive walls of the internal waveguide, can be regarded in many embodiments as lying outside the overall microwave envelope. It is noted that the embodiment of FIG. 14 includes a microwave transmissive window that provides for hermetic sealing of the port.

Heat spreading (e.g., by use of an inner heat spreading enclosure) may be advantageous, and in many cases essential, especially for furnace embodiments intended for use with parts of widely varying size, shape, and number from one furnace run to another. In general, heat spreading facilitates higher quality (e.g., higher precision and better shape retention) even for single parts. Thus, a larger volume of high spatial temperature uniformity generally facilitates the processing of larger and/or greater numbers of high quality high precision parts. In general, especially for many metal sintering applications, using high performance heat spreaders to provide for excellent temperature uniformity (e.g., <10 C variation throughout the inner enclosure) can be a highly effective approach for achieving both quality (high precision and good shape retention) and flexibility (larger parts and/or large numbers of parts). The approaches described herein address this concern at least in part by explicitly arranging heat spreading enclosures to serve as an integral component of the microwave applicator. The techniques and methods described have the further advantage of being highly efficient with respect to microwave power— this is achieved in part by restricting the portion in the furnace chamber that is exposed to microwave power. This described approach is by no means limited to cavity applicators.

Several other embodiments and various aspects thereof will be described immediately below. It should be appreciated that for the embodiments throughout this disclosure, various aspects and features can be readily interchanged between the different embodiments, and a person of ordinary skill in the art should be able to contemplate many combinations that are not explicitly set forth herein.

Figure 15:
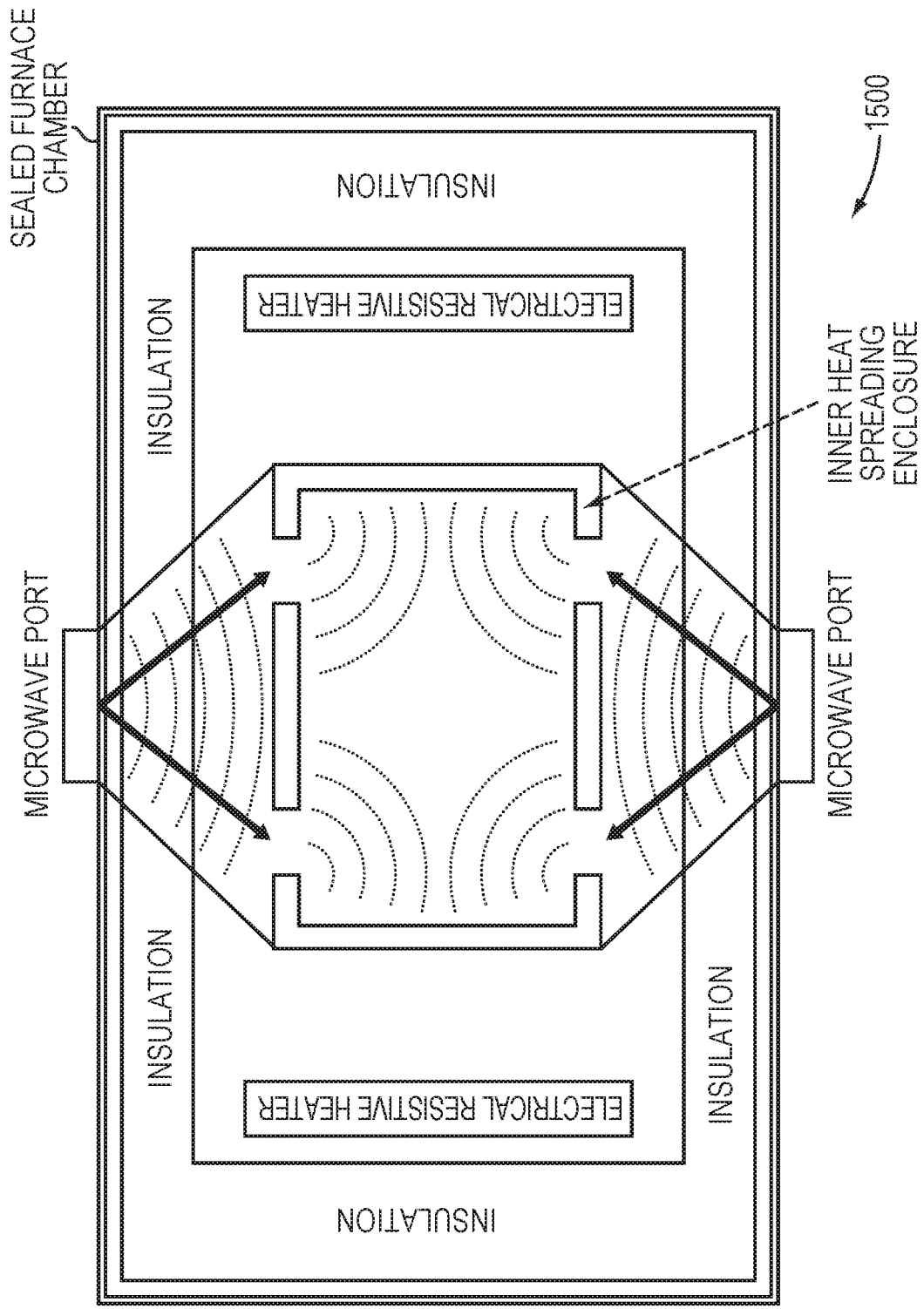
FIG. 15 illustrates an embodiment in which apertures are introduced in one or more walls of an inner heat spreading enclosure.

FIG. 15 illustrates a furnace chamber 1500 in an embodiment in which apertures are introduced in one or more walls of an inner heat spreading enclosure. This approach can facilitate greater uniformity of microwave power with the inner enclosure.

Figure 16:
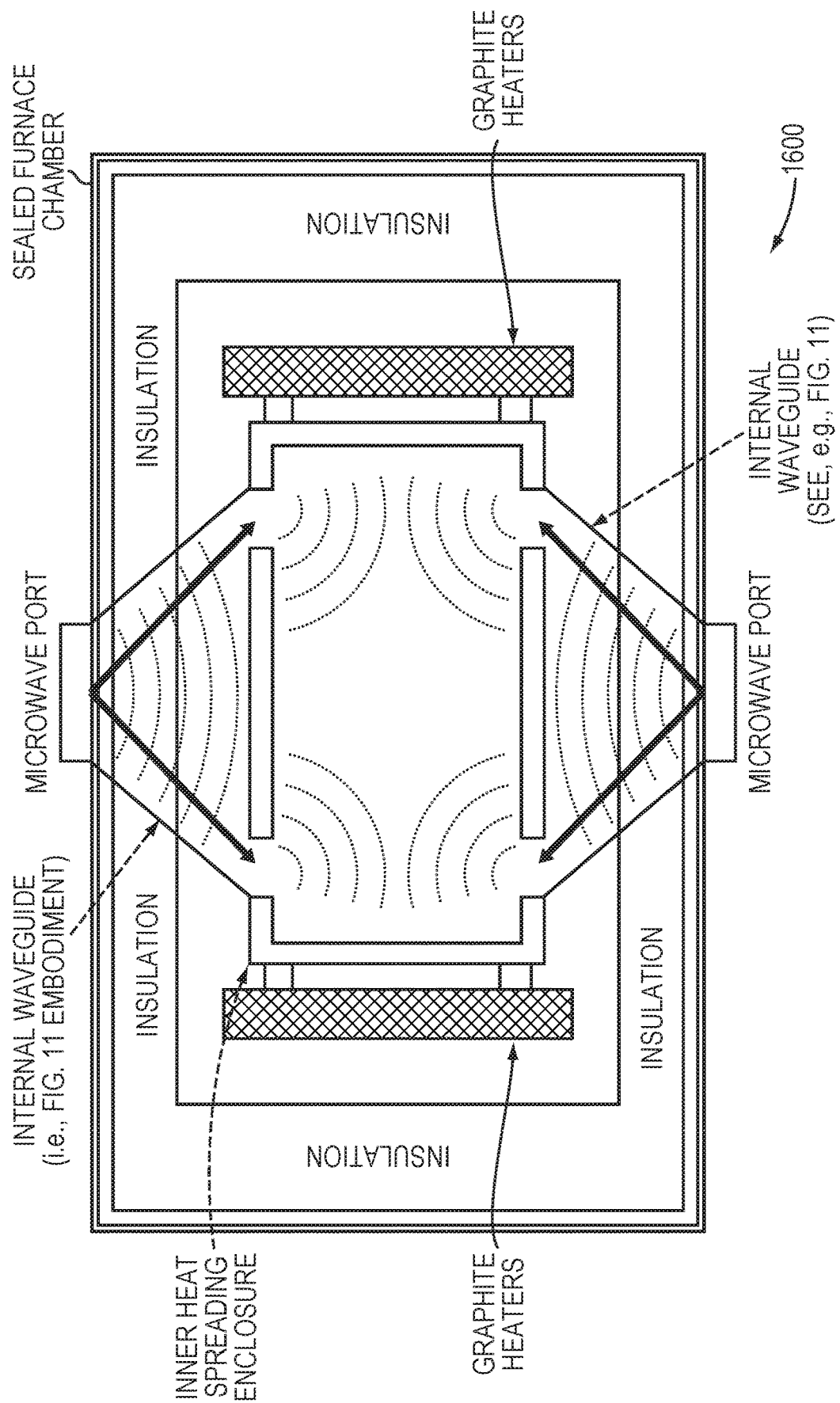
FIG. 16 illustrates an embodiment in which compact heaters are integrally mounted to the inner heat spreading enclosure.

FIG. 16 illustrates a furnace chamber 1600 in an embodiment in which compact heaters are integrally mounted to the inner heat spreading enclosure. This can allow for a larger inner heat spreading enclosure relative to the size of the furnace chamber. In some cases, a larger inner enclosure can allow for more and/or larger parts and can also provide for a larger number of microwave resonant modes within the enclosure which can, in turn, facilitate greater uniformity of microwave power within the enclosure. In other cases, the integral heater arrangement can allow for a smaller overall chamber while maintaining similar thermal insulation. Aperture feeds on walls of inner enclosure could facilitate greater degree of microwave power uniformity.

Figure 17:
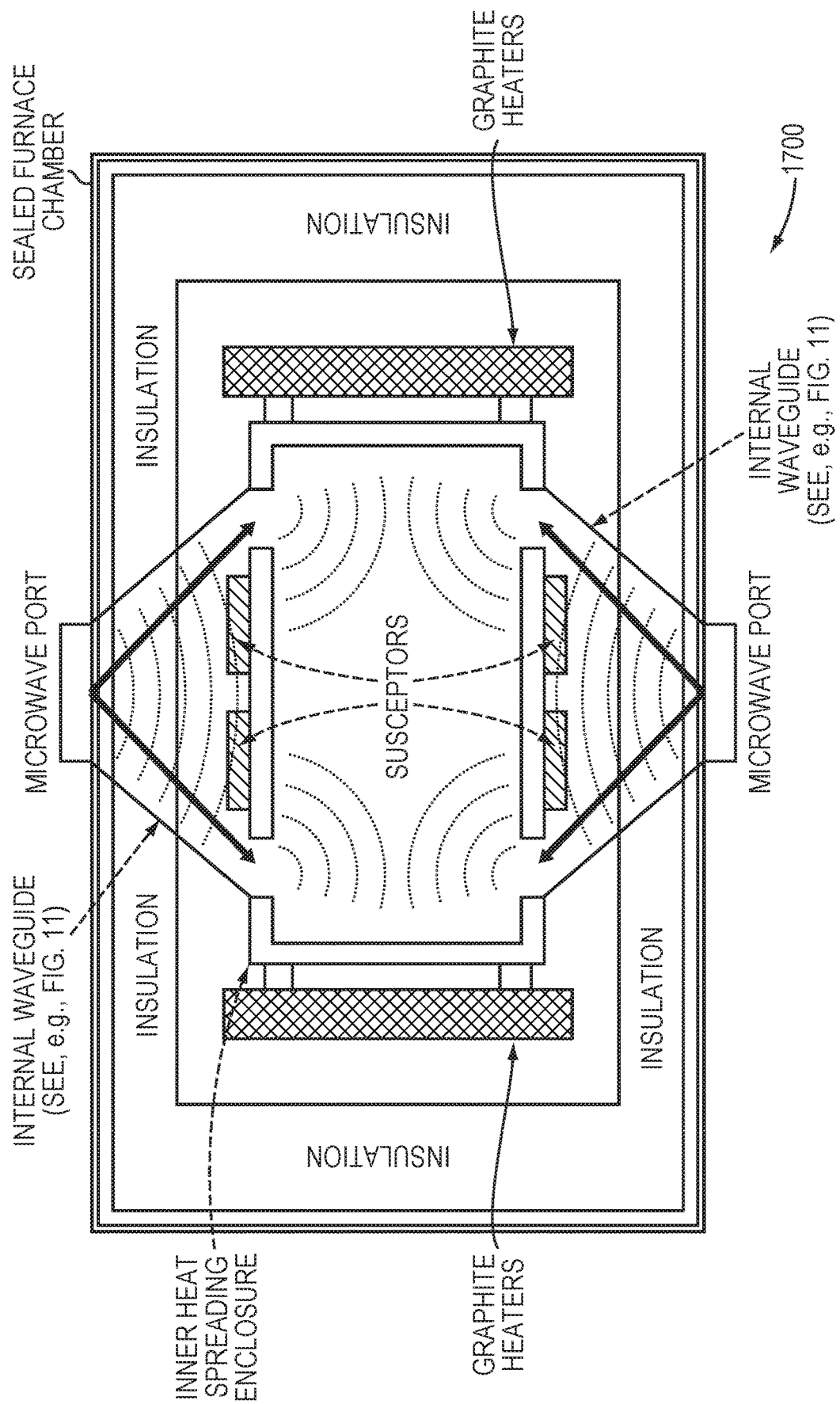
FIG. 17 illustrates an embodiment in which microwave absorbing susceptors are mounted on or in close thermal communication with the inner heat spreading enclosure.

FIG. 17 illustrates a furnace chamber 1700 in an embodiment in which microwave absorbing susceptors are mounted on or in close thermal communication with the inner heat spreading enclosure. These can provide for various benefits including but not limited to: compensating for thermal power lost through the thin waveguide walls; Q spoiling of microwave resonances to facilitate improved or at least better behaved and more stable coupling between microwave source (i.e., magnetron) and the overall in-chamber microwave structure. Compact heaters mounted to inner heat spreading enclosure can allow for larger size inner enclosure relative to furnace chamber size.

Figure 18:
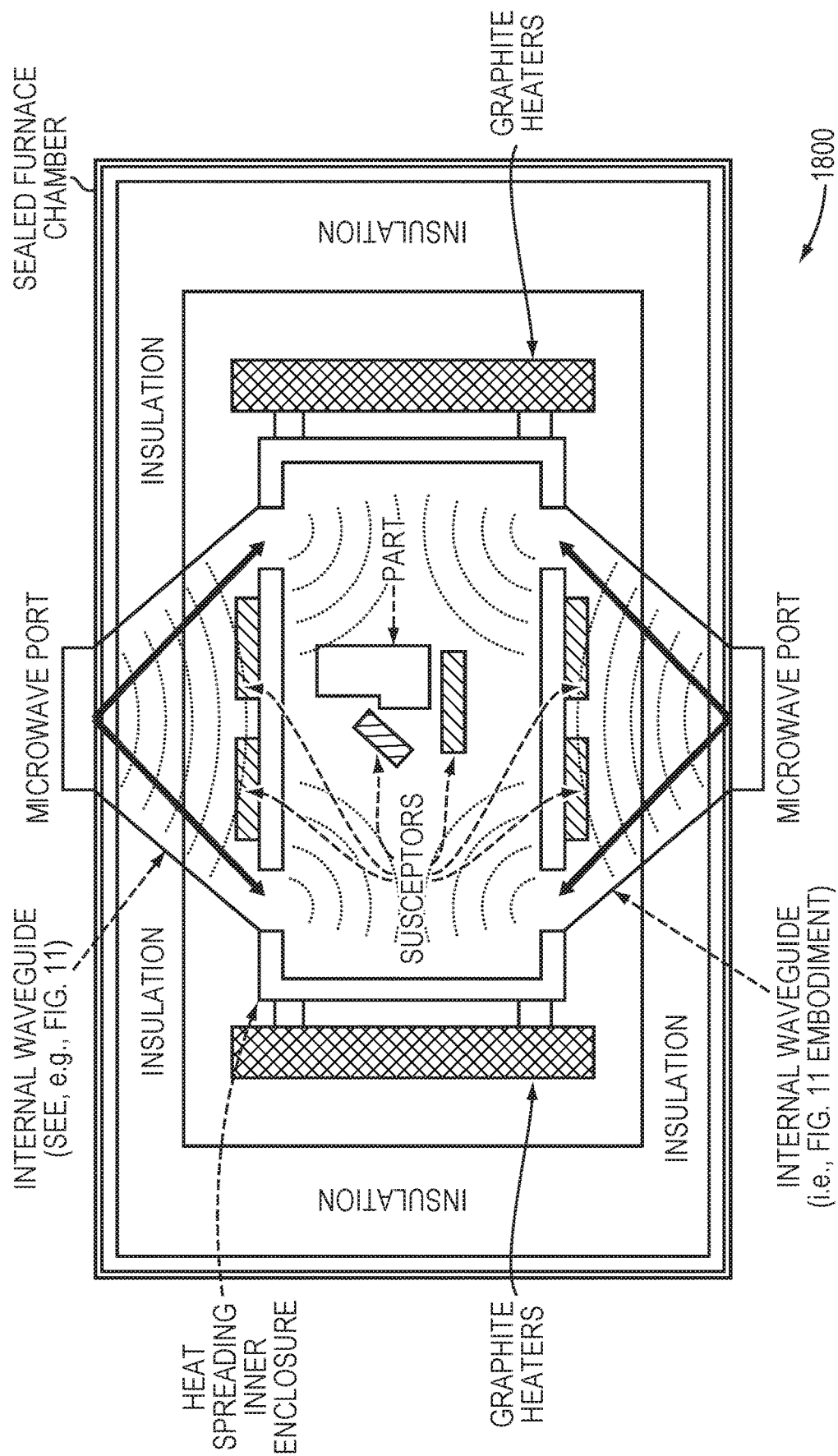
FIG. 18 illustrates an embodiment in which microwave absorbing susceptors can be arranged in thermal communication with a part.

FIG. 18 illustrates a furnace chamber 1800 in an embodiment in which microwave absorbing susceptors can be arranged in thermal communication with a part. This can provide for various benefits including but not limited to delivery of supplemental heat to a one section of a part vs. another. Similarly, though not illustrated, susceptors may be placed in thermal communication with one part or group of parts, with no susceptors placed near a different part or group of parts.

Figure 19:
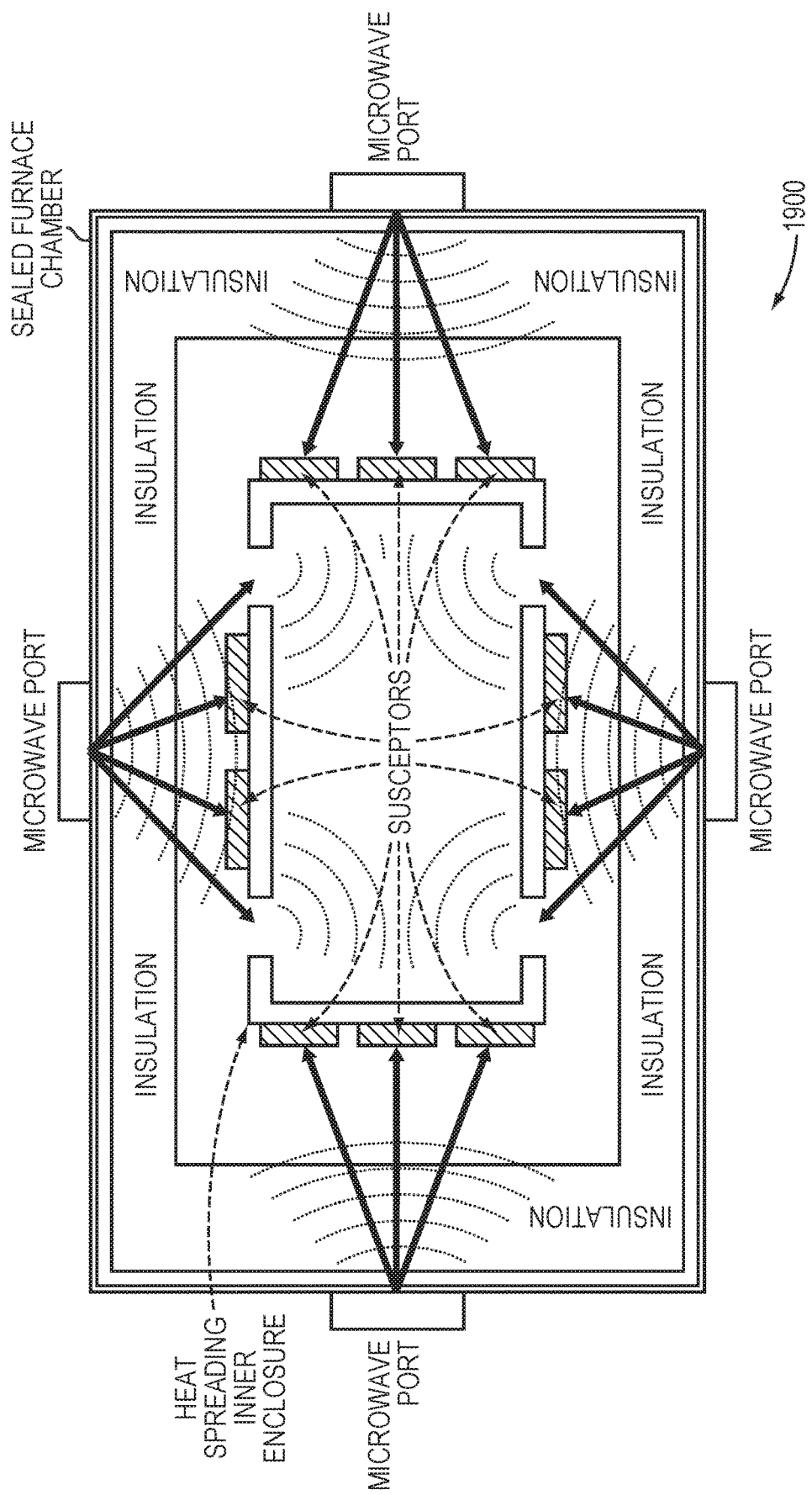
FIG. 19 illustrates an embodiment in which there are no electrical resistive heaters.

FIG. 19 illustrates a furnace chamber 1900 in an embodiment in which there are no electrical resistive heaters. This embodiment incorporates multiple microwave power ports that can be used as part of the feed as described in reference to FIG. 14. Conventional microwave furnace systems tend to utilize only one high power source as opposed to multiple low power sources as is illustrated here. Low power mass manufactured magnetrons, each having 700 W to 2 KW output power can be obtained for remarkably low cost. Furthermore, total microwave power can be controlled by selectively controlling the number of magnetrons that are activated at any given time. This can provide for a number of benefits including enhancing magnetron lifetime by lowering the duty cycle on each magnetron. Also, the technique can be executed in a way that facilitates better time averaged spatial uniformity in microwave power that is better than the instantaneous spatial uniformity at any given time. Furthermore, the use of a plurality of magnetrons can facilitate a higher degree of spatial uniformity of microwave power by virtue of radiating the part from all a greater number of directions as compared to systems that have one source and one microwave port. It should be appreciated that many of the embodiments described herein may employ multiple sources and, correspondingly, multiple microwave ports. As described previously in reference to FIG. 14, microwave a microwave feed (magnetron, external waveguide, and microwave port) can be tuned to maximize forward power transmission into the chamber and minimize backward reflection back toward the magnetron. In the context of any multiple feed system such as the one depicted in FIG. 19, embodiments may provide various approaches for minimizing cross-coupling between the different feeds. In one approach, flags are rotated in a coordinated way such that the flags are synchronized in patterns that minimize total average cross coupling. In another approach, magnetrons are only co-activated in groups that are naturally isolated from one another by substantially lossy pathways elements including parts and susceptors. For example, in a highly-loaded system, having therein a large number of lossy parts, magnetrons can be activated only in opposing pairs such that power absorbed by a first one is largely absorbed by the time is reaches a second opposing magnetron. The use of many magnetrons, as opposed to one more powerful magnetron, tends to reduce sensitivity to plasma by spreading the microwave power amongst a larger number of ports as opposed to feeding it through one single port, at comparatively higher intensity, to achieve the equivalent total. The use of inner waveguides is not necessarily required in order to provide for microwave radiation within a given inner enclosure. In some cases it may be desirable to eliminate the use of inner waveguides and to accept the various tradeoffs that this entails, such as increased microwave loss in the insulation.

Figure 20:
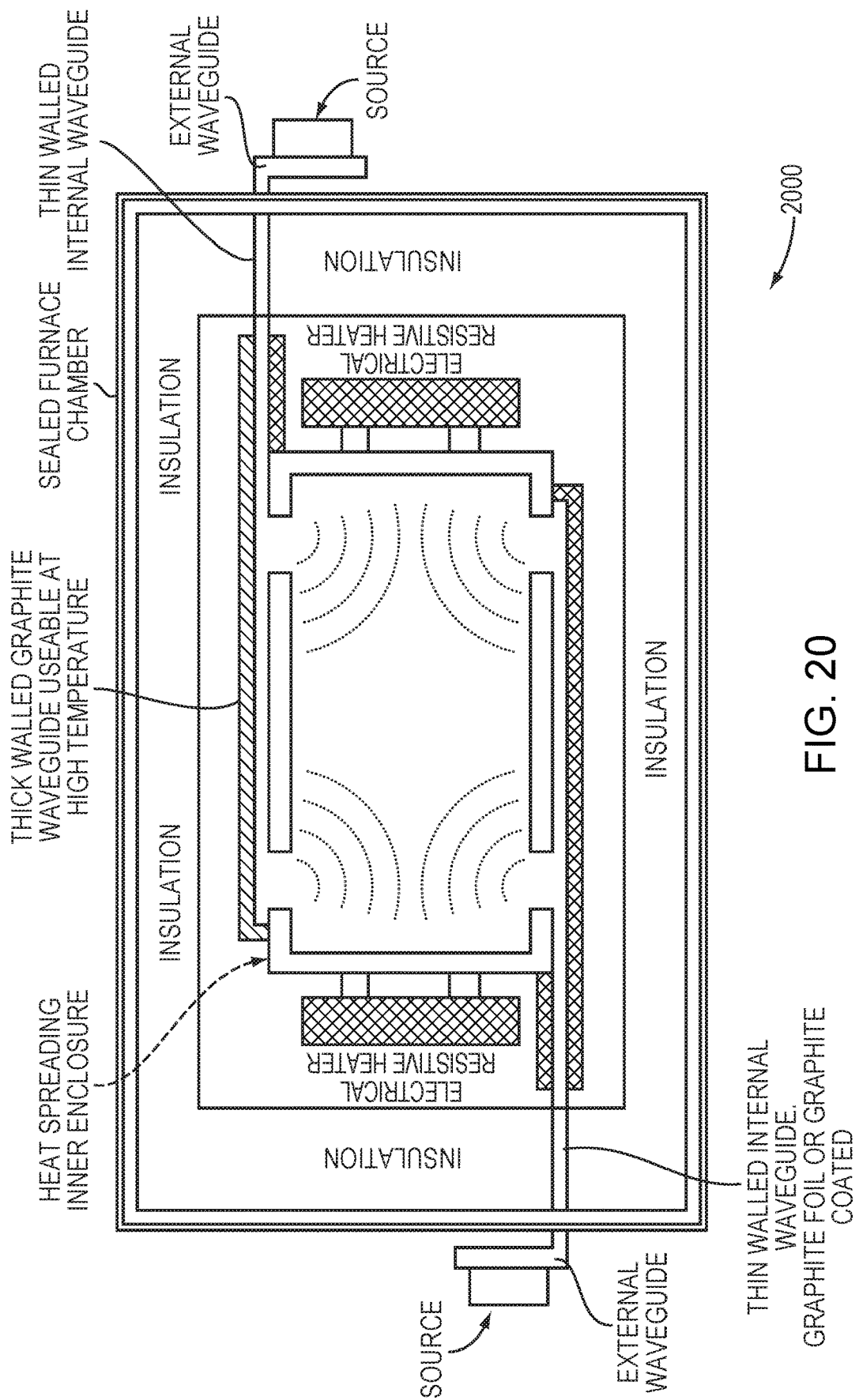
FIG. 20 illustrates an embodiment that couples power into the inner heat spreading enclosure by way of waveguide apertures within a thick-walled graphite waveguide integrally connected with the inner heat spreading enclosure.

FIG. 20 illustrates a furnace chamber 2000 in an embodiment that couples power into the inner heat spreading enclosure by way of waveguide apertures within a thick-walled graphite waveguide integrally connected with the inner heat spreading enclosure. (Waveguide aperture coupling is a known technique in the context of conventional metal walled waveguides and cavities.) Thin walled internal waveguides can be employed to guide power from the external waveguides to the thick-walled graphite waveguides. This embodiment can facilitate a high degree of spatial uniformity of microwave power within the inner enclosure.

Figure 21:
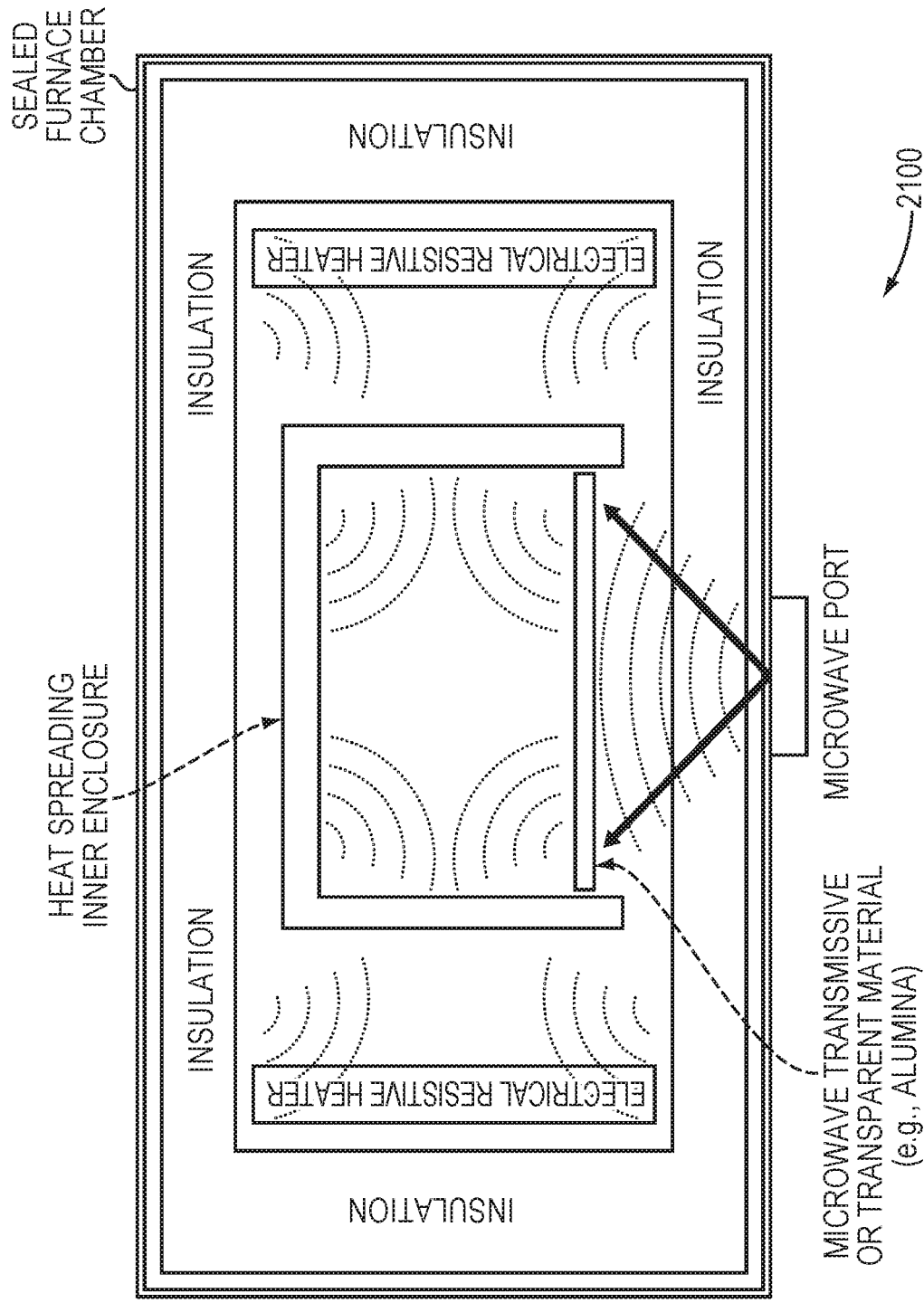
FIG. 21 illustrates an arrangement wherein microwaves are coupled through a port and into the chamber such that a significant amount of radiated power can enter an inner enclosure through a microwave transmissive enclosure wall.

The use of inner waveguides is not necessarily required in order to provide for microwave radiation within a given inner enclosure. For example, FIG. 21 illustrates an arrangement wherein microwaves are coupled through a port and into the chamber such that a significant amount of radiated power can enter an inner enclosure through a microwave transmissive enclosure wall. Various materials such as alumina and other ceramics may provide for sufficient microwave transparency and can also can be configured (e.g., made thick enough) to spread heat to serve as a heat spreading enclosure wall. By avoiding the use of in inner waveguide this embodiment can reduce or eliminate any heat losses that can arise through waveguide walls.

Figure 22:
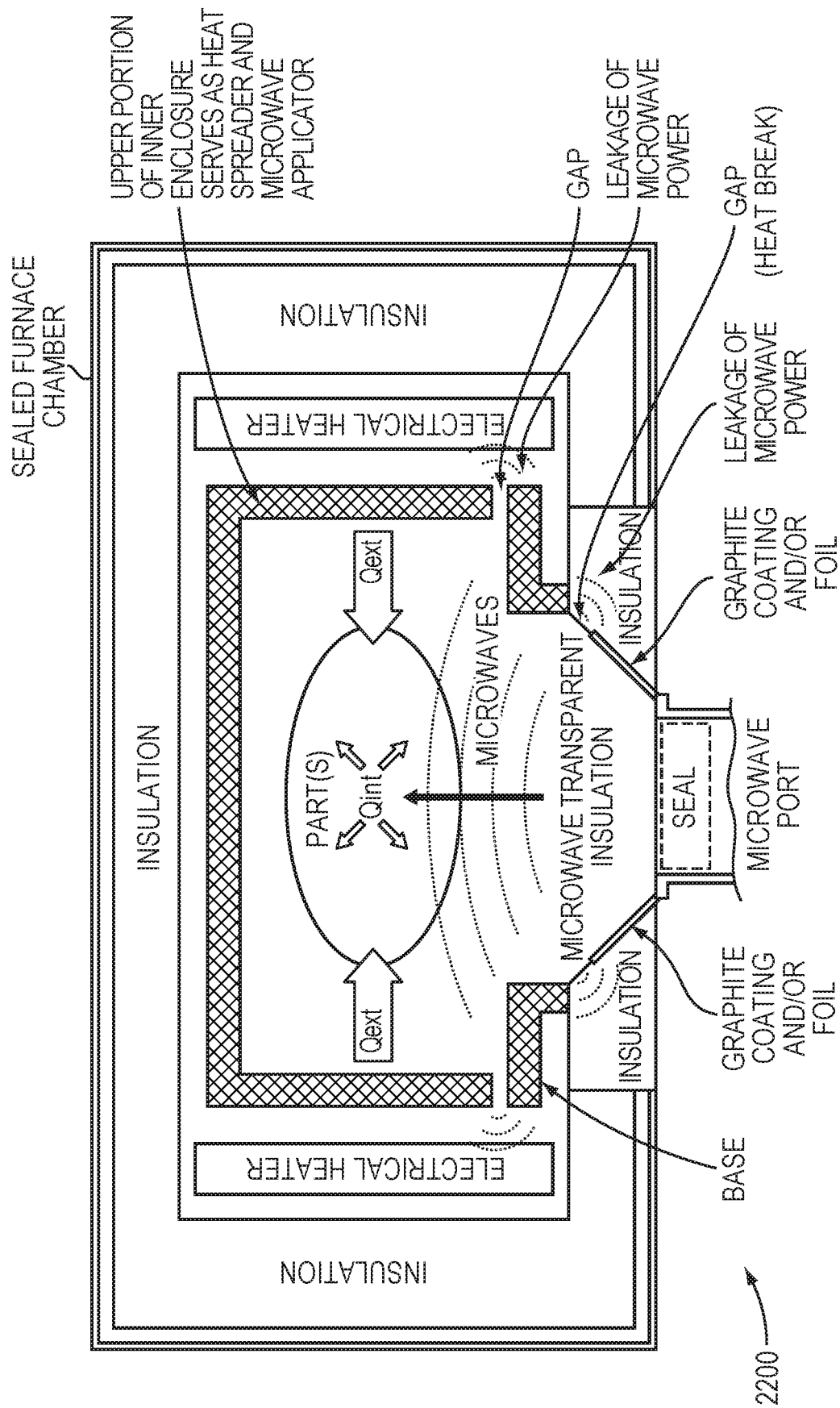
FIG. 22 illustrates an embodiment having portions of the inner waveguide that are not covered with foil.
Figure 23:
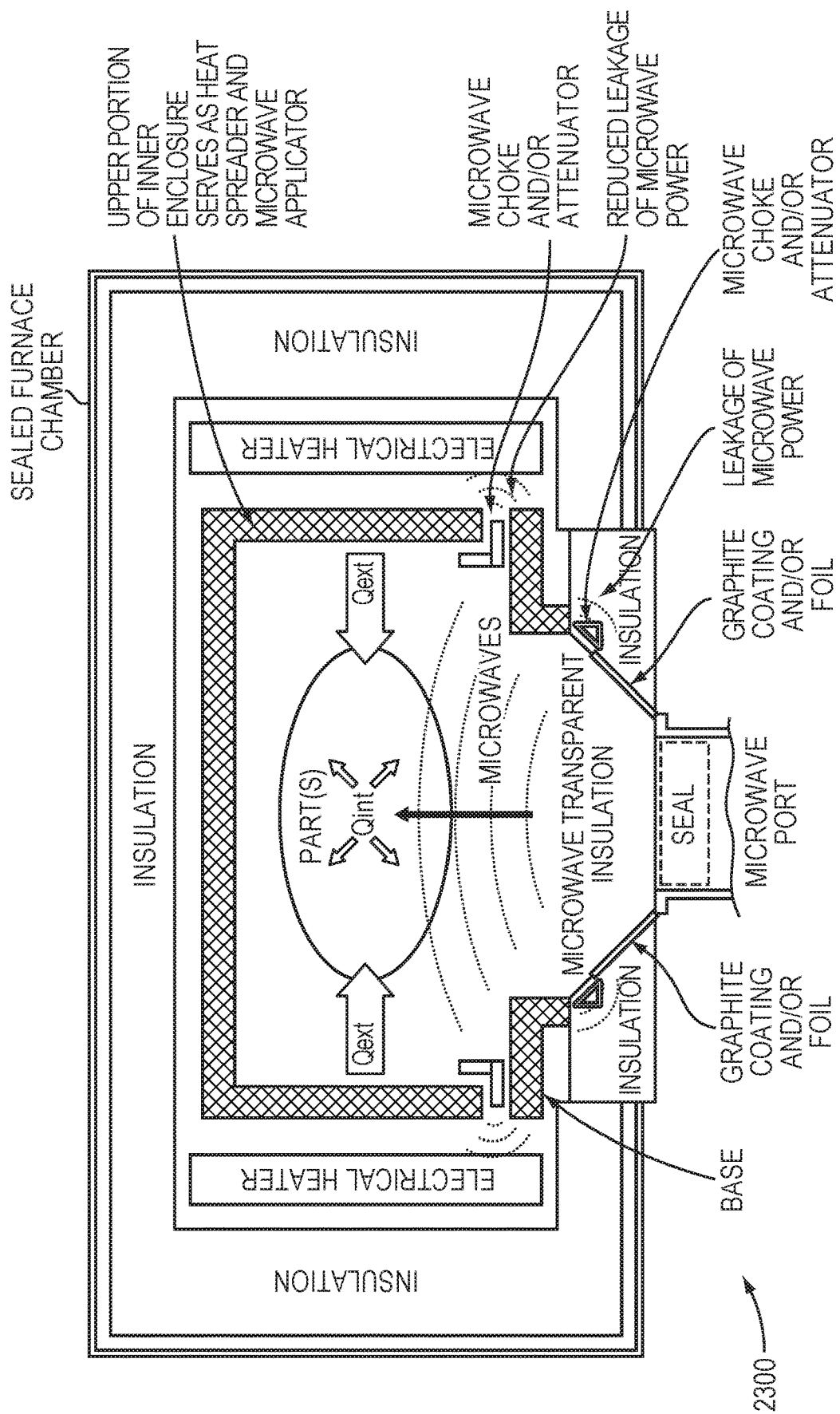
FIG. 23 illustrates the use of microwave chokes and/or attenuators that can be arranged to reduce or attenuate any leakage through the previously described gaps.

FIG. 22 illustrates a furnace chamber 2200 in an embodiment having portions of the inner waveguide that are not covered with foil. Many of the benefits and advantages of the various embodiments described herein can be captured even in cases where the inner waveguide is not completely and continuously coated. As indicated in the figure, a certain amount of microwave leakage can escape from inside the internal waveguide to other portions within the furnace enclosure. However, in many cases the overall input path, from the microwave port to the inside of the inner enclosure, can be arranged such that the amount of leakage is kept within acceptable limits. In some cases a gap may actually be desirable as a way to provide for a heat break to reduce the flow of thermal power from the inner enclosure to the furnace wall. Similarly, it can be acceptable to include gaps in the walls of the inner heat spreading enclosure, provided that the gaps are arranged in a manner that sufficiently limits any resulting leakage of microwave power. In some cases it may be advantageous to include a gap. For example, the presence of a gap can be beneficial as a way of dealing with requirements that the inner enclosure should be accessible for installing and removing parts. For example in the embodiment of FIG. 22 the upper portion of the inner enclosure can be raised from the base to allow parts to be loaded and unloaded, and the presence of a gap may be preferable to a peripheral contact zone that may have unreliable and/or unpredictable electrical performance with regard to arcing and plasma discharge. In regard to gaps (in the inner waveguide and/or in the walls of the inner enclosure). In many cases, microwave chokes of various kinds can be configured in and around the vicinity of a given gap in order to substantially block microwave leakage. Various techniques such as traditional ¼ wave door chokes, and other microwave interactive structures can designed in order to at least reduce the amount of leakage at any given gap. In some cases well placed dielectric discontinuities can be introduced in order to serve this purpose. For example, FIG. 23 illustrates a furnace chamber 2300 implementing microwave chokes and/or attenuators that can be arranged to reduce or attenuate any leakage through the previously described gaps. In reference to FIGS. 23 and 24, lossy microwave chokes may be implemented as attenuators by employing SiC or some other high temperature material that is highly lossy with respect to microwaves. In such configurations small gaps tend to result in greater attenuation in a manner that is predictable base on known electromagnetic theory and engineering.

Figure 24:
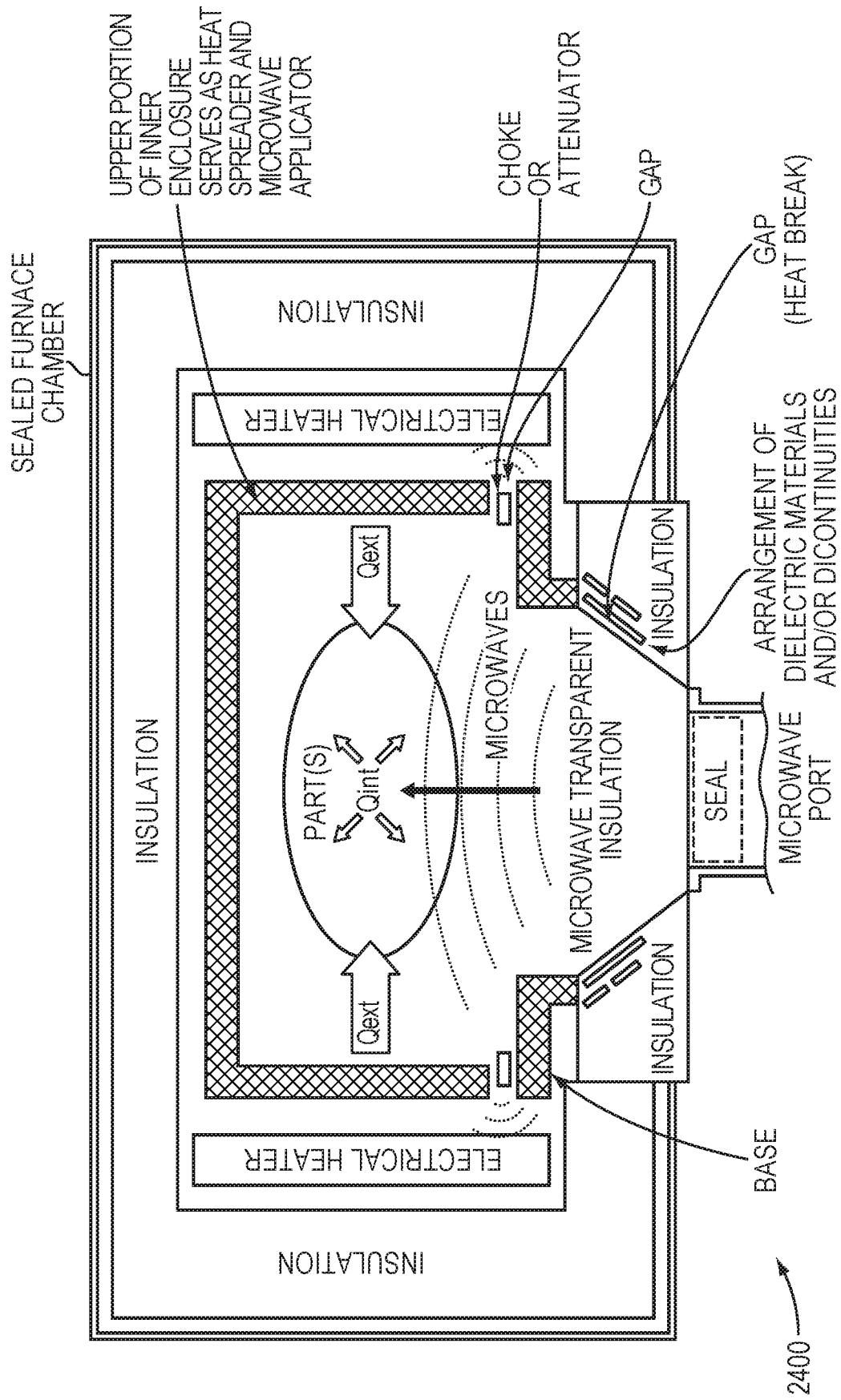
FIG. 24 illustrates an inner dielectric waveguide constructed as an arrangement of dielectric materials and/or discontinuities that at least partially guide and direct the microwave power.

FIG. 24 illustrates a furnace chamber 2400 in a further embodiment. With reference to FIG. 21, the furnace chamber 2100 does not use an inner waveguide. Electrically-conducting layers and/or coatings are not the only means by which microwaves can be internally guided from the microwave port to the inner enclosure. As illustrated in FIG. 24, an inner dielectric waveguide can be constructed as an arrangement of dielectric materials and/or discontinuities that at least partially guide and direct the microwave power. Various microwave dielectric guiding techniques may be employed including but not limited to dielectric gradient waveguiding techniques, and/or some variation of microwave band gap structures. In regard to gaps in the enclosure wall, for example a gap between the enclosure base and the upper portion of the enclosure, a lossy choke can be arranged for example by arranging SiC and or other lossy dielectric materials in or near the gap.

Having described various systems and techniques, the terms "retort" and "heat spreading retort" can be used interchangeably with the terms "inner enclosure" and "inner heat spreading enclosure." It is noted that this that interchangeability can have implications that extend beyond mere terminology at least for the reason that various embodiments of the inner enclosures and/or inner heat spreading enclosures described herein may be used as part of various strategies of gas handling and atmosphere management.

While the term "graphite" has been used throughout this description, the term is by no means intended as being limiting, especially with respect to the structures (such as the heat spreading inner enclosure, the waveguide walls, and the insulation on which the coatings and foils can be laminated.) There are numerous carbon and carbon-based materials that can be employed while remaining within the scope of the above teachings. For example, all or any of the immediately aforementioned structures (the inner heat spreading enclosure, the graphite insulation that can serve as a substrate for graphite coatings and/or graphite foil) and various other graphite features may be composed of other high temperature carbon based materials including but not limited to carbon-carbon composites, chopped fiber carbon materials and many other carbon containing high temperature materials. One of ordinary skill in the art will recognize a wide variety of materials that can be utilized within the scope of the embodiments described herein.

Furthermore, the heat spreading enclosure may include ceramic materials while remaining within the overall scope of these teachings. Insofar as many ceramics are not electrically conductive, this does not prohibit their use as portions of the structures and methods that are described herein, and a person of ordinary skill in the art having this description in hand should be able to identify numerous ways in which ceramic materials may be employed while still remaining within the scope of what is taught and disclosed.

Having introduced various embodiments that employ an inner heat spreading enclosure as a microwave applicator, it is again noted that in many of these embodiments the inner enclosure walls can be composed of an electrically conducting material including but not limited to graphite, carbon-carbon composite and other carbon based materials. The use of electrically conducting material can cause the inner enclosure to exhibit microwave performance and characteristic analogous to metal-based applicators such as conventional microwave ovens. As described previously, electrically conductive materials such as graphite tend also to be thermally conductive, and this thermal conductivity can be highly advantageous insofar as it facilitates heat spreading and/or high performance heat spreading. Functionality of the inner heat spreading enclosure. Insofar as the heat spreading inner enclosure can be composed of electrically and thermally conductive material, the descriptions herein should not be construed as being limited to the use of one single material composition for achieving both properties. For example, the inner heat spreading enclosure may be composed of a thermally conductive alumina box that is coated with an electrically-conductive layer. In another example, the inner heat spreading enclosure may be constructed as a layered arrangement including layers of thermally conductive ceramic overlaid and/or underlaid by layers of electrically and thermally conductive graphite. The forgoing is just one example of a variation encompassed by this disclosure, and a person of ordinary skill in the art can readily contemplate many variations that are considered to fall within the scope of these teachings.

Embodiments described above include many advantageous features that can certainly be employed in conjunction with an inner heat spreading enclosure that is not electrically conducting. Various features described above may be employed with no inner enclosure. For example, various features of the embodiments of FIGS. 12, 14, 19, and 20 can be employed in various combinations without the use of electrically conductive inner heat spreading enclosures. These figures and the associated descriptions illustrate just some of the features and aspects that may be contemplated in this context, and a person of ordinary skill in the art could readily contemplate many combinations of the described features and aspects that could be advantageously employed with or without an inner heat spreading enclosure, electrically conductive or otherwise.

The above techniques and systems can advantageously applied to processing of parts produced by additive manufacturing, and more specifically to furnaces used in the debinding and sintering processes in connection with manufacturing processes of powdered metallurgy, and in particular the three-dimensional printing of metallic objects. Furnaces used for debinding of green objects or sintering of brown objects are known in the art, and typically employ thermal heating methods. Debinding is the process is which much of the binder material used to build the green part is removed. This process may use either heat or chemicals (or a combination of both) to remove a significant amount of the binders, leaving a brown part ready for sintering. In the sintering process, the brown part is subjected to temperatures close to the melting point of the material, removing remaining secondary binder material, joining metal powder material, and leaving the densified part.

As mentioned at various points above conventional furnaces typically use resistive heating elements that tend to ramp up in temperature slowly to work over a long period of time. Further, the resistive elements tend to change their resistance over time, making it increasingly difficult to supply power. The sintering process and side-reactions run faster during microwave sintering at the same temperature, which results in different properties for the sintered product.

In direct microwave sintering, microwaves can interact directly with the part to sinter the powdered metal, rather than via radiative heat transfer from an external heat source. Oftentimes, microwaves only penetrate a short distance in materials with a high conductivity and a high permeability. This can present certain challenges in achieving uniform heating, in part, because coupling can depend on object geometry, such as variations in the thickness of object parts, or shapes. Further, powdered metal parts can exhibit a wide range of coupling properties and interactions with microwaves over different temperature and sintering states. New temperature profiles for direct microwave sintering need to be developed since microwave sintering mechanisms can differ from those in a conventional electric heater based (non-microwave) furnace. In addition, it is often desirable that there should to be some minimum coupling so that the Q factor of the microwave cavity is not too high, otherwise coupling can become unstable and microwave power non-uniformity can be exacerbated. In addition, some minimum absorptive coupling can provide magnetrons with a better behaved load as compared to a system having less absorptive coupling—this better behaved load can allow them to work for many hours. Otherwise, magnetrons may require a circulator, which can be an expensive component. These issues can increase the difficulty of achieving uniform heating with direct microwave sintering. Many of the systems and techniques described herein can be employed to address this consideration. In some cases, microwave sintering can be performed using susceptors as, for example, in FIG. 26. Susceptors are materials designed to absorb microwaves and radiate heat.

Example embodiments may be implemented in applications of three-dimensional printing using metal as a build material for forming a three-dimensional object. A variety of commercially available compositions have been engineered for metal injection molding ("MIM"). These highly engineered materials can also be adapted for use as a build material in printing techniques such as fused filament fabrication ("FFF"), or other fabrication techniques such as stereolithography or binderjetting. Any reference to "MIM materials," "powder metallurgy materials," "MIM feedstocks," or the like shall generally refer to metal powder and/or ceramic powder mixed with one or more binding materials, e.g., a backbone binder that holds everything together and a bulk binder that carries the metal and backbone into position within a mold or print, unless a different meaning is explicitly provided or otherwise clear from the context.

These materials, or other materials similarly composed of metal powder and a binder system, may be used to fabricate green parts that can be debound and sintered into fully densified metallic objects, and may be processed into a final object as contemplated herein. The final object may include a metal, a metal alloy, a ceramic, or another suitable combination of materials.

Figure 25:
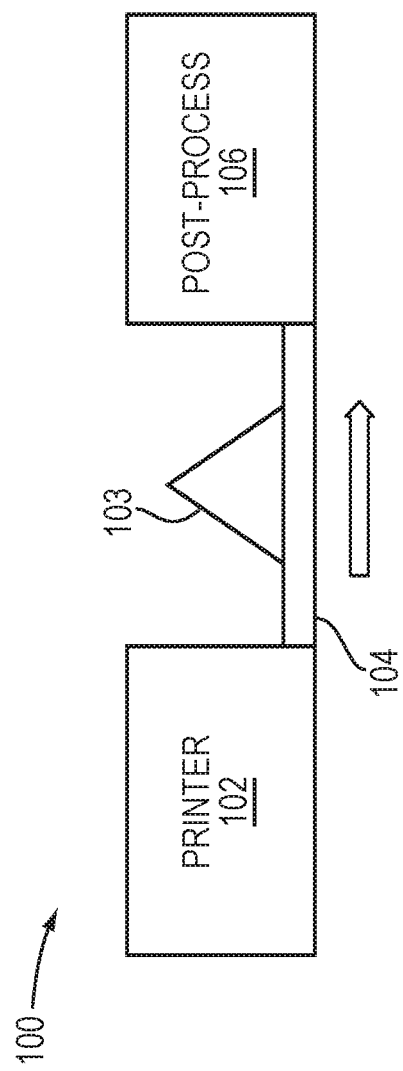
FIG. 25 is a block diagram of an additive manufacturing system.

FIG. 25 shows an additive manufacturing system for use with metal injection molding materials. The system 100 may include a printer 102, a conveyor 104, and a post-processing station 106.

In general, the printer 102 may be any of the printers described above including, for example a fused filament fabrication system, a stereolithography system, a binder jet fabrication system, or any other system that can be usefully adapted to form a net shape object under computer control using injection molding build materials. The output of the printer 102 may be an object 103 that is a green part (or green body) including any suitable powder (e.g., metal, metal alloy, ceramic, and so forth, as well as combinations of the foregoing), along with a binder that retains the powder in a net shape produced by the printer 102. The output of some printers (e.g., binder jet printer) may result in a brown part, with much less of the binder material than would be found in a green part.

The conveyor 104 may be used to transport the object 103 from the printer 102 to a post-processing station 106 where debinding and/or sintering can be performed. The debinding and sintering processes result in roughly 20% shrinkage in volume from the original green part.

The conveyor 104 may be any suitable device or combination of devices suitable for physically transporting the object 103. This may, for example, include robotics and a machine vision system or the like on the printer side for detaching the object 103 from a build platform or the like, as well as robotics and a machine vision system or the like on the post-processing side to accurately place the object 103 within the post-processing station 106. In another aspect, the post-processing station 106 may serve multiple printers so that a number of objects can be debound and sintered concurrently, and the conveyor 104 may interconnect the printers and post-processing station so that multiple print jobs can be coordinated and automatically completed in parallel. In another aspect, the object 103 may be manually transported between the two corresponding stations.

The post-processing station 106 may be any system or combination of systems useful for converting a green part formed into a desired net shape from a metal injection molding build material by the printer 102 into a final object through debinding and sintering. Contemporary injection molding materials may be engineered for thermal debinding, which makes it possible to perform a combination of debinding and sintering steps with a single device. While the thermal specifications of a sintering furnace will depend upon the powder to be sintered, the binder system, the loading, and other aspects of the green object and the materials used to manufacture same, commercial sintering furnaces for thermally debound and sintered MIM parts will typically operate with an accuracy of +/−5 degrees Celsius or better, and temperatures of at least 600 degrees C., or from about 200 degrees C. to about 1900 degrees C. for extended times. In some instances, if the binder is water based, the furnace may operate at even lower temperatures. Any such furnace or similar heating device may be usefully employed as the post-processing station 106 as contemplated herein. Vacuum or pressure treatment may also or instead be used, and can be provided by way of an atmosphere control system as described previously. In an aspect, identical or similar material beads with a non-binding coating may be used for a furnace support—e.g., packing in a bed of this material that shrinks similar to the part, except that it will not bond to the part.

While thermal debinding may be performed through a single device, typically, thermal debinding can have long processing cycles. In some instances, it may be preferable to initially debind the green part with a solvent wash to remove much of the binder material, leaving a brown part to be processed in a separate sintering oven.

Figure 26:
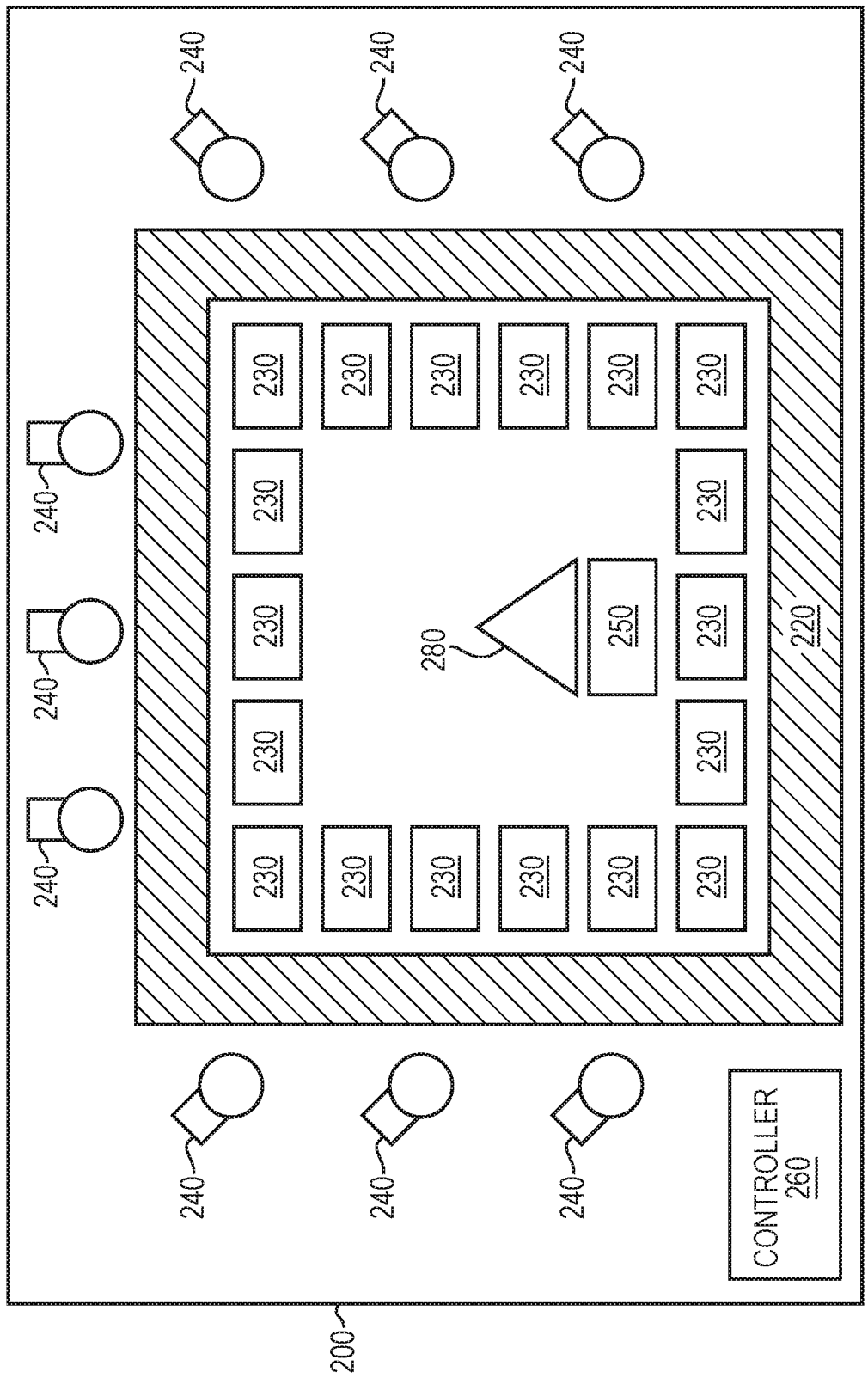
FIG. 26 is a block diagram of a sintering furnace in an example embodiment.

In one embodiment, the post-processing station 106 may be a furnace system 200 as illustrated in FIG. 26 to process the green or brown object. Furnace 200 employs a series of magnetrons 240 to direct microwave energy through a microwave transparent insulation material 220 to heat susceptors 230 that provides an enclosure 210 to heat the green or brown object 280. Insulation layer 220 allows the microwave energy to heat the susceptor 230, while keeping the heat within the enclosure. The susceptors 230 provide a good thermal load which facilitates a reduced cavity Q, making it easy to couple in microwaves and excite many modes, which can make heating more uniform. The large area of susceptors also can promote uniform heating even during fast ramp times. An evenly distributed arrangement of susceptors in some embodiments reduce the heat spreading requirements with demanded of the inner heat spreading enclosure. The object 280 may be positioned on an insulated base plate 250 within the enclosure 210. In example embodiments, the base plate 250 may be stationary, or may rotate with the enclosure 210 to reposition the object 280 as needed.

As mentioned above, where the binder system of the build material is also engineered for thermal debinding, the method may include debinding the green object by applying microwave energy, e.g., using the post-processing station 106 described above. Binders in powered metal parts tend to couple well to microwaves. A direct microwave debind may be used to debind an object very quickly by selectively heating up a binder much faster than the rest of the part. With sufficiently small skin depth, only the binder on the outer shell of the part may be heated. Binders need to be heated from the outside in order to avoid cracking.

In debinding, the very high susceptibility of the binder and relatively low susceptibility of the metal means most of the power is absorbed near the surface of the binder. As the surface of the binder moves into the part, the relatively low absorption of the now debound material outside the bound material allows the microwave energy through to the now submerged surface of the binder, where the energy is efficiently absorbed. This energy is then able to contribute to the energy required to evaporate/break down the binder right at the binder surface. This allows a very high energy and to some extent temperature gradient at the binder surface. This process can proceed rapidly so that the interior of the part can remain relatively cool, so that there is no internal pressure build up due to phase change on the inside.

In the case of microwave only debinding various aspects of debinding can differ as compared to conventional techniques using external heaters. Within a part, the microwave power can be absorbed in an exponentially decaying distribution at the surface of the binder, so it frees the outer surface of the binder, where the binder can escape safely through the open porosity previously exposed. This front of binder breakdown/evaporation can rapidly move deep into the part. A steep power absorption and temperature gradient can be produced at the surface of the binder. The inside can remain cool and safe from evaporation. Contrast this with conventional heating, where the heat tends to enter from the surface of the part rather than the surface of the binder. Conventional heating means the power to evaporate the binder is limited by the thermal conductivity of the material and the process proceeds much more slowly and must be done very carefully to avoid damaging the part.

In example embodiments, pulsed conventional heating may be used to debind by heating the part radiantly and quickly so that the conduction limited heat transfer meant the inner part do not get too hot. Then, before the temperature of the interior gets too high, the part is cooled. The process is then repeated. This pulsed debinding is limited by the fact that the heat must now come from the surface of the part. The microwave power allows the heat to be produced at the surface of the binder as that surface moves through the part and is not limited by conduction of the heat, just by the ability of the microwaves to propagate through the material. This pulsed heating may result in a safer and faster debind process.

After the furnace has debound the green part, the sintering process may begin. The microwave power may be used to raise the temperature more uniformly throughout the part, either through direct microwave energy into the part, or by the use of microwaves to heat the susceptors to heat the enclosure.

Microwave Debinding and Sintering

A first stage debind is often done via chemical processes. When parts formed from materials printed via heat are first-stage debound in a furnace, the material often flows and slumps. Microwave-based approaches may solve this problem by adding heat energy only where they are absorbed and independent of the temperature: microwaves are essentially "cold" heat. This allows first-stage debind equipment and handling to be eliminated and reduces processing time, chemical handling and disposal, and opportunity for part damage.

Microwaves are absorbed well by most binders and can penetrate powder metal (or ceramic) to add energy at the surface of the binder (even if that surface is under the skin of the part.) Additionally, microwaves are "cold," in that they will not crack the hydrogen-carbon (HC) bonds. Microwaves can add the heat of transformation energy effectively and quickly without requiring anything to be hotter than the paraffin breakdown temperature. Thus, done correctly, microwave debinding should allow first stage debinding to occur in a furnace at low temperature.

Alternatives are other forms of radiation that penetrate powder metal (or ceramic or other bound material). It may not be required that the binder be preferentially heated even though that is an advantage. The frequency might be other than microwave. Microwave here is essentially just a term for an electromagnetic radiation that penetrates the surface of the powder material and interacts with the binder below the surface of the powder. The frequency might be other than microwave. Any frequency of electromagnetic radiation that penetrates the powder (or other form of) bound material and interacts with the binder should be covered if properly worded. Microwave sources may also be used to supplement other types of first stage debind, such as chemical debind, by adding energy where it is needed.

As mentioned above, where the binder system of the build material is also engineered for thermal debinding, the method may include debinding the green object by applying microwave energy, e.g., using the post-processing station 106 described above. Binders in powered metal parts tend to couple well to microwaves. A direct microwave debind may be used to debind an object very quickly by selectively heating up a binder much faster than the rest of the part. With sufficiently small skin depth, only the binder on the outer shell of the part may be heated. Binders need to be heated from the outside in order to avoid cracking the part.

Debinding objects typically requires a long time and can consume substantial quantities of process gas. Debinding may occur at temperature ranging from 150 to 375 C. Phase transformation energy is required to break the PP bonds and drive the gas out. If the vapors from cracking the PP become too hot, the HC bonds break (crack) leading to soot, which can ruin the part. Radiation heat transfer is very weak in this temperature range, and conduction in the material is poor, especially with infill. Convection is dependent on gas pressure and the temperature change and is also weak. Hence debind has always demanded a lot of gas flow and time. If we try to debind at low pressure or in a vacuum to save gas, the primary way to add energy becomes conduction from contact with the base or radiation from the walls, which must be significantly hotter than the part to get heat transfer, leading to cracking of HC and sooting. Thus, debind may require sweep gas to remove the HC before soot occurs even the heat is from conduction and/or radiation. As debind occurs, the material interface between binder and unbound material moves inward, yet conventional heat is all added at the surface of the part—heat transfer is even worse and debind takes a very long time for thick parts. Further, the debound material has even worse thermal conductivity than bound material Microwaves solve this problem by adding heat energy only where they are absorbed and independent of the temperature: microwaves are essentially "cold" heat.

Microwaves may be absorbed well by most binders and can penetrate powder metal (or ceramic or any bound material) to add energy at the surface of the binder (even if that surface is under the skin of the part.) Additionally, microwaves are "cold". They will not crack the HC. Microwaves can add the heat of transformation energy effectively and quickly without requiring anything to be hotter than the PP breakdown temperature. Thus, done correctly, microwave debinding should allow debinding to occur in a vacuum because the HC vapors are not cracked to form soot because there is nothing hot enough to crack them. Thus, in addition to a faster and safer debind, little or no gas use may be required during debind with microwaves.

Alternatives approaches may include other forms of radiation that penetrate powder metal (or ceramic or other bound material). It may not be required that the binder be preferentially heated even though that is an advantage. The radiation frequency might be other than microwave. Any frequency of electromagnetic radiation that penetrates the powder (or other form of) bound material and interacts with the binder should be covered if properly worded.

Printed Susceptors

In some cases of susceptor assisted microwave sintering, a susceptor layer may be printed around the part in green the state such then when this printed microwave susceptor/absorber is exposed to microwaves, internal to a microwave sintering furnace, may greatly improve heating efficiency as only the region around the part would be heated instead of the entire furnace. This geometry may then be cracked open to reveal the sintered part inside. The same printed microwave susceptor may also allow localized heating and geometry dependent thermal control based on the transferred knowledge of the part geometry from the print portion of the ecosystem to the furnace, allowing for part specific cycle modifications in real time.

Configurable Debinding and Sintering

In example embodiments, susceptors may be configured to either selectively allow some microwaves into the interior of the inner enclosure to directly de-bind and/or sinter the object. In some embodiments, the susceptors may be arranged and controllably manipulated to allow microwaves through. By doing so, the furnace may be able to provide a more customized sintering process based on an object's profile characteristics, such as the build material and geometries.

Where many binders can tend to couple well with microwaves, powdered metals in many cases may couple only weakly with microwaves at low temperatures. The furnace controller may be programmed to store and make use of the material profile of the object, as well as the object geometry, and provide a customized debinding and/or sintering process for use with the furnace.

In example embodiments, the furnace may apply direct microwave energy from the magnetrons to the part to debind and/or sinter the part. In yet other embodiments, the furnace may apply the microwave energy to susceptors for full susceptor debinding and/or sintering using thermal profiles of the object. In yet other embodiments, a combination of both direct microwave energy and susceptor hearing can be used in either or both the debinding or the sintering process.

Alternatively, resistive heating elements may be used instead of microwaves at any desired temperature. For some resistive heating element materials, a combination of microwave and resistive heating is possible to allow the temperature and heat flow to be adjusted favorably. Movable susceptors that are removed at high temperatures or susceptors that "turn off" at high temperatures because of material properties provide another means of balancing the conventional types of heating: thermal radiation, convection, and conduction; with the microwave "bulk" heating to achieve the desired temperature distribution and heat flow. An example of materials that can be configured to a self-adjusting susceptor include Zirconia, which can suscept at a high temperature and concentrates field due to high dielectric constant, and SiC suspects at all temperatures and tends to deflect rather than focus microwave fields due to electrical conductivity.

Susceptor and Enclosure Configurations

In example embodiments, the susceptors 220 may consist of SiC. SiC tiles suscept enough such that they do not need to be very dense to provide a good load and are extremely durable by design. FIG. 3 illustrates a geometric layout of SiC susceptors 330 embedded in insulation material 320 wherein the susceptors are configured in a manner that provides a uniform heat distribution.

In example embodiments, a heat spreader may also be used to block direct microwaves where needed, provide more uniform heat across a larger volume, and a lower heat flux. In other embodiments, the susceptors 220 may be placed in a manner that substantially blocks direct microwaves from magnetrons 240.

Magnetrons

Some embodiments may use many inexpensive off-the-shelf magnetrons 240 instead of one more powerful industrial magnetron. This may be enabled by good susceptor material that provides minimal reflections that may destabilize or damage an inexpensive magnetron. Using multiple, smaller magnetrons may also help avoid issues of plasma discharge that might otherwise occur with industrial magnetron operating with a high frequency electromagnetic radiation in the GHz range, because the power density is distributed between many waveguide feeds. Further a plurality of magnetrons 240 may be placed in a manner where they direct microwave energy from a number of different directions, contributing to getter temperature uniformity.

In other example embodiments, the plurality of magnetrons may be individually controlled by a controller 260 to operate in a manner that preserves magnetron durability and provides particular heating schemes. For example, a system of several magnetrons may be controlled by turning them on and off all together (inexpensive magnetrons have no intermediate power levels available). However, this can result in excessive on/off switching, which reduces magnetron lifetime, and larger temperature deviations with each switch. A better approach would be to turn on each magnetron in succession, with more magnetrons staying on at the same time as more power is needed. This allows rapid changes in power, but each magnetron sees a more reasonable switching period.

In some example embodiments, a thermocouple (not shown in FIG. 26) may be integrated into the enclosure, such that the susceptors shield the thermocouple tip, which is the part that most distorts the field. The thermocouple tube may be placed relative to the susceptor box (for example, between SiC times) such that the impact on the field is minimized.

Monitoring and Controlling Thermal Gradients

In any furnace that is capable of producing a high ramp rate, a wide range pyrometer view for may be beneficial. In other example embodiments, the furnace may speed the process by inferring the temperature gradient in the part, and control the ramp rate based on the inferred temperature gradient. For microwave direct processing, the temperature variation may be great, so being able to scan the part would be significant.

Microwave heating combined with radiative heating can produce either a U, flat or up-side-down U (^) temperature distribution in the part. In many cases an objective is to heat rapidly with a flat distribution. For reasonable part thickness, this occurs when the microwave heats the part and the environment temperature matches the core temperature—then the part loses no heat from the surface and the temperature is reasonably flat. The problem is how to measure whether the distribution is U, flat, or ^ with a surface temperature measurement.

A way to monitor and address the thermal gradient within the part, includes varying or pulsing the microwave power. For example, briefly cut the microwave power and watch the surface temperature of the part. To simplify the demonstration, set the environmental temperature to the current surface temperature (which was rising due to the fast heating) and cut microwave power. If the temperature distribution was flat, then the temperature won't change much—the matched environment temperature will exactly balance the heat flow at the surface. If the temperature distribution was U, then the surface temperature will fall as the core draws heat from the surface. If the temperature distribution was ˆ, then the surface temperature will still rise even though microwave power was cut as the core heat spreads to the edges.

In practice, where the heating is rapid, it can be impractical to set the environment temperature, so the perturbation in the slope of the temperature rise when the microwave is power is cut would indicate the temperature gradient at the surface of the part, and thus whether the temperature distribution is flat or curved. The power of the next microwave pulse would be raised or lowered based on the measurement so that the temperature profile is driven to be relatively flat even as the ramp rate is rapid. Also, the environmental heater power may be adjusted to better match the heating power of the microwave if that heating rate is within the safe operating rise rate. Thus, there is a way to infer and correct the temperature distribution in the part with a single surface temperature measurement.

The microwave insulation pack may be produced with one or more small holes, each having a small field of view. Large holes in the insulation pack are not practical when trying to maintain lower power. In some embodiments, a part may sit on a rotating turntable offset from the viewing port in stationary (top) insulation so a pyrometer can scan the part (or parts) as the turntable rotates. While one hole may provide sufficient measurement, several holes may be used to provide at least a few measurements.

Another way to get some wider field of view from a relatively small hole is to view some domed or faceted low emissivity (reflective) material to get a reflected view of the region of interest. This is sort of a "fish eye" or "insect eye" view. Though typically troublesome in getting an accurate temperature measurement, the reflected radiation may be used to measure temperature in the region(s) being reflected. One step in this process is to either know the emissivity of the material(s), especially the reflector, very well and/or to put a "black body" hole in it to measure the temperature of the reflector and/or material of interest. The motivation for this is that there are not any nice, easy mirrors at the steel processing temperatures.

These methods of improved temperature sensing may provide greater temperature control, within the furnace enclosure that may generate temperatures up to 1,400 degrees Celsius.

Customized Sintering Process

In other example embodiments, the furnace may receive feature information about the parts being sintered, either manually, or through other communications means. For example, object information (e.g., geometry, material composition, desired finish, pre-fabrication model information, post-fabrication scanned information, etc.) may be sent directly from a printer or other device (e.g., computer, smartphone) via a wired connection or wireless connection. The furnace may store precise temperature profiles for every part and material. Based on the received features, a controller 260 can develop sintering parameters and configure the furnace according to the parameters and develop a customized sintering process to produce the sintered object.

In addition, microwave patterns may be controlled with antenna positions in such a manner that minimizes coupling between magnetrons. The microwave patterns may also be controlled to spend additional time in more favorable positions that have the most uniform fields. Microwave antenna can be controlled and used to directly heat the part, or to energize susceptors ensuring homogeneous heat with wave-spin technology to uniformly disperse the microwaves. The antenna and magnetrons may also be controlled to distribute power in a favorable manner, for example to distribute power in such a way to produce uniform and rapid temperature rise or hold. In general, power distribution to raise temperature is different from the distribution required to hold temperature.

In some embodiments, a furnace may be operated via an external control system, which may also be in communication with other components of an additive manufacturing system (e.g., printer, debinder, control interface). Through such a control system, the user may select from a queue of available parts requiring sintering. The user may select a part from the pending sintering list and other incompatible parts are subsequently greyed out from further selection, while still allowing the user to select other compatible parts for inclusion in the sintering cycle. The user may be offered various options for the cycle including part position within the sintering space, level selection, graphic orientation suggestions and other reminders to guarantee product outcome.

Once a part or parts are selected, the system polls the DM cloud for the appropriate processing cycle including the thermal profile, the gas and vacuum settings and the correct gasses and volumes of gasses to enable the process cycle.

The user reacts to on-screen prompts whereby, special gas species are requested, which are supplied in high pressure gas bottles of various mixtures and purities. These gasses are contained within pressurized gas bottles that have an integrated read/write RFID chip and corresponding encrypted information including but not limited to gas type, bottle pressure, fill date, a bottle specific—non-reoccurring serial number, an ecosystem validation sequence, fill location and other material information that would enable a safe and correct gas utilization within the furnace.

The user inserts the gas bottles into one or both engineered onboard retaining stations and connects the bottle to the gas interconnection piping. The user closes the bottle carrier/door and the furnace system interrogates the bottle for the information required to complete the cycle.

Various automated system validation, safety and operational checks are performed by the furnace, with the information relayed back to the cloud for action, logging, and diagnostics. These might include vacuum tightness and vacuum leak-up rate checks, gas pressure path validation, electrical heating and microwave systems validation. The automated routines will run and afford an appropriate level of system status & integrity to ensure a trouble-free process cycle on a cycle by cycle basis.

Once all systems are automatically validated, the process cycle starts and is monitored continuously by the on-board and cloud based supervisory software systems. Pre-warning alarms, maintenance and troubleshooting sequences are automatically pushed to the user interface, regardless of device.

Various part and materials specific parameters are controlled by a cloud "recipe" system, where process changes are pushed to the furnace that may include iterative cycle updates that extend or expand the function of the process operations based on the part geometry.

After the cycle is complete, another series of automatic operational validation checks are performed without user interaction and these results are published to the user, logged to a cloud database and then the user is allowed to remove the parts.

Partial Microwave Sintering

In yet other embodiments consistent with the furnace shown in FIG. 26, the susceptors may be configured to either selectively allow some microwaves into the interior of the enclosure to directly de-bind and/or sinter the object. In some embodiments, the susceptors may be mechanically adjusted and controlled to allow microwaves through. By doing so, the furnace may be able to provide a more customized sintering process based on an object's profile characteristics, such as the build material and geometries.

Gas Flow Management

In still further example embodiments, a controlled gas flow may be provided into the furnace enclosure to prevent the binder from contaminating the insulation. A sweep gas may flow over the part, through a thermally conductive tube that is in contact with the susceptor box so that the gas is not too cold. A path is provided for debind products to flow out without touching the insulation, with a constant vacuum pulling the gas in.

In one aspect, the post-processing station 106 may include an inert gas source 108. The inert gas source 108 may, for example, include argon or other inert gas (or other gas that is inert to the sintered material), and may be housed in a removable and replaceable cartridge that can be coupled to the post-processing station 106 for discharge into the interior of the post-processing station 106, and then removed and replaced when the contents are exhausted. The post-processing station 106 may also or instead include a filter 110 such as a charcoal filter, catalytic converter, or the like for exhausting gasses that can be outgassed into an office environment in an unfiltered form. For other gasses, an exterior exhaust, or a gas container or the like may be provided to permit use in unventilated areas. For reclaimable materials, a closed system may also or instead be used, particularly where the environmental materials are expensive or dangerous.

In the furnace, to minimize the presence of $O_2$ within the enclosure during sintering, there is a need to seal the retort against the insulation pack at the hold temperature. Example embodiments may include a liquid metal seal to provide this seal. The inlet and outlet of the furnace retort would go into a dish which had an aluminum alloy with a slightly lower melting point than the sintering temp. When the seal metal melts, the gas flow is shut off. Example embodiments may use a conductivity measurement to detect the melting of the metal seal by separating two electrodes and when the (now melted) seal wicks in, closing the circuit. As the furnace heats a few more degrees to the sintering temperature, the gas can bubble through the seal without any back flow. A Magnesium getter on the inside of the chamber would still provide a low $O_2$ content.

In example embodiments, the furnaces controlled atmosphere may consist of vacuum (sub-atmospheric) partial pressure of vacuum, flowing gasses of various compositions and purity, positive pressure gas processing or any combination of these throughout the full thermal processing cycle including cooling portions of the cycle.

Flow rates and ultimate vacuum/gas pressure levels are materials and part geometry specific and may include flexible gas introduction and gas exit paths, integration of printed gas flow routes from the three-dimensional printing process along with printed in gas flow shields, turbulators or other process gas delivery modifications that can be engineered into the printed part. Part specific gas impingement or protective forms from the three-dimensional print process and integrated into a common gas/vacuum and flow path manifold are some embodiments of this feature.

Process gas and vacuum pumping routes are specifically engineered to minimize the interaction of the byproducts of thermal decomposition of the polymer or other binders, by rapidly removing these contaminants from the part zone. Additionally, external valving is employed in such a manner as to redirect gas and vacuum flow paths to lessen the adverse effects of fugitive oxygen contamination by specifically reversing the process gas (vacuum flow path such that the bound oxygen and water are drawn away from the heat part processing zone at temperatures where this bound contaminates are released.) In other embodiments, the gas flow direction may be reversible through a system of diversion valves/flaps that allow sweep gas to move from top to bottom/bottom to top or left to right/right to left or other static or dynamic full geometric orientation of a cyclic and recipe controlled gas path—efficiently sweeping the gas across parts and removing byproducts of debinding and sintering to the onboard residue collection and processing systems Gases are injected to the furnace at various portions of the thermal cycle, via multiple potential injection points/routes and at automatically controlled rates wholly dependent on the part geometry information that may be received from a three-dimensional printer.

Gases injected into the system may be pre-heated to reduce the parasitic thermal losses on the system and prevent cold gas interactions with the part which would be detrimental to the mechanical and microstructures of the parts being sintered. This action may be accomplished by microwave interaction with a susceptor tube or gas delivery system where the flow path through the suscepting materials transfers the heat to the gas. Additional implementations may include internally routed gas lines in proximity to the isothermal hot zone, allowing heat pickup by proximity or direct mechanical coupling to bring the cold gas to part temperature prior to interaction with the debinding or sintering parts.

Safety Systems

Figure 27A:
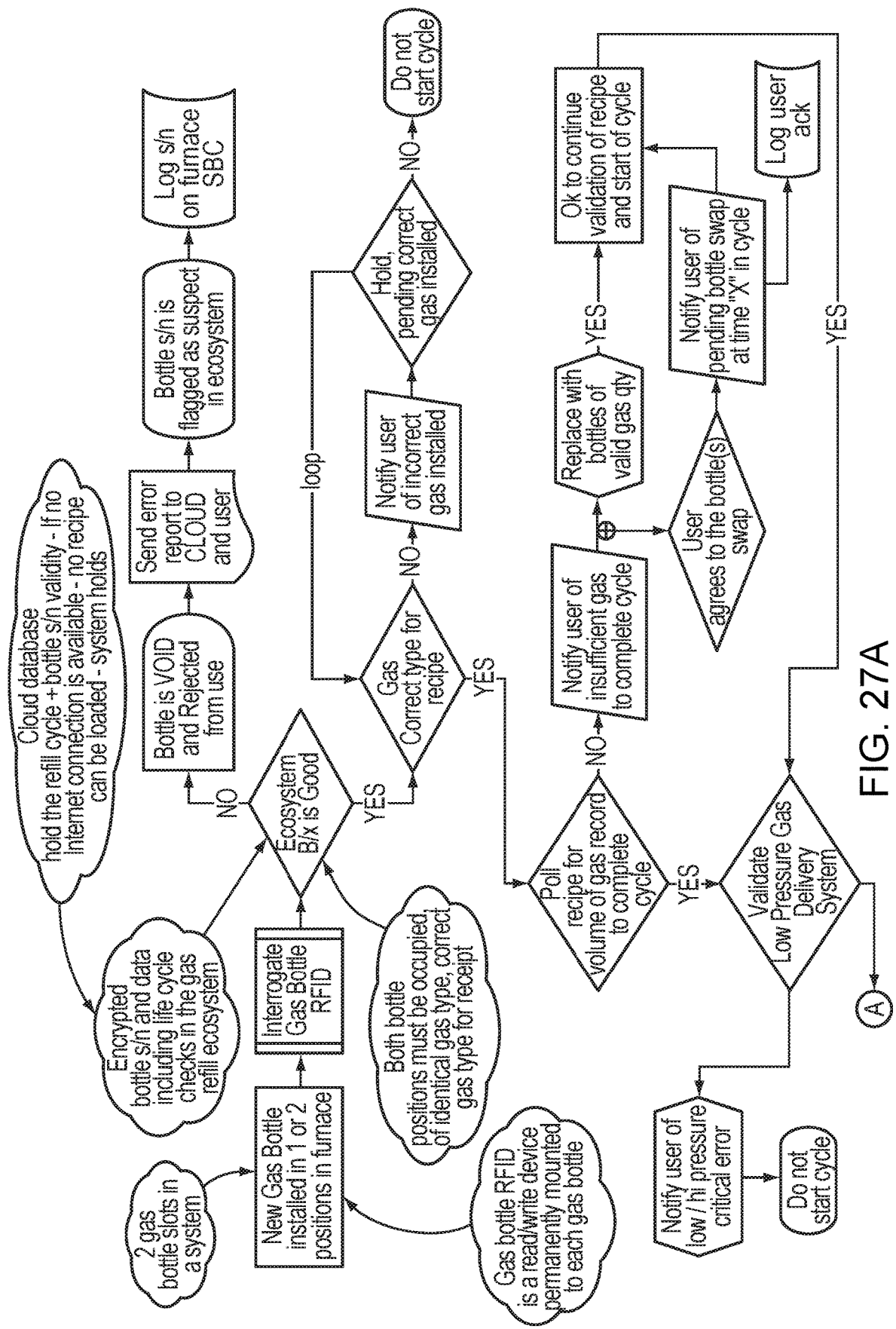
FIGS. 27A-B are flow charts illustrating a method of gas management for the safety and process in an example embodiment.
Figure 27B:
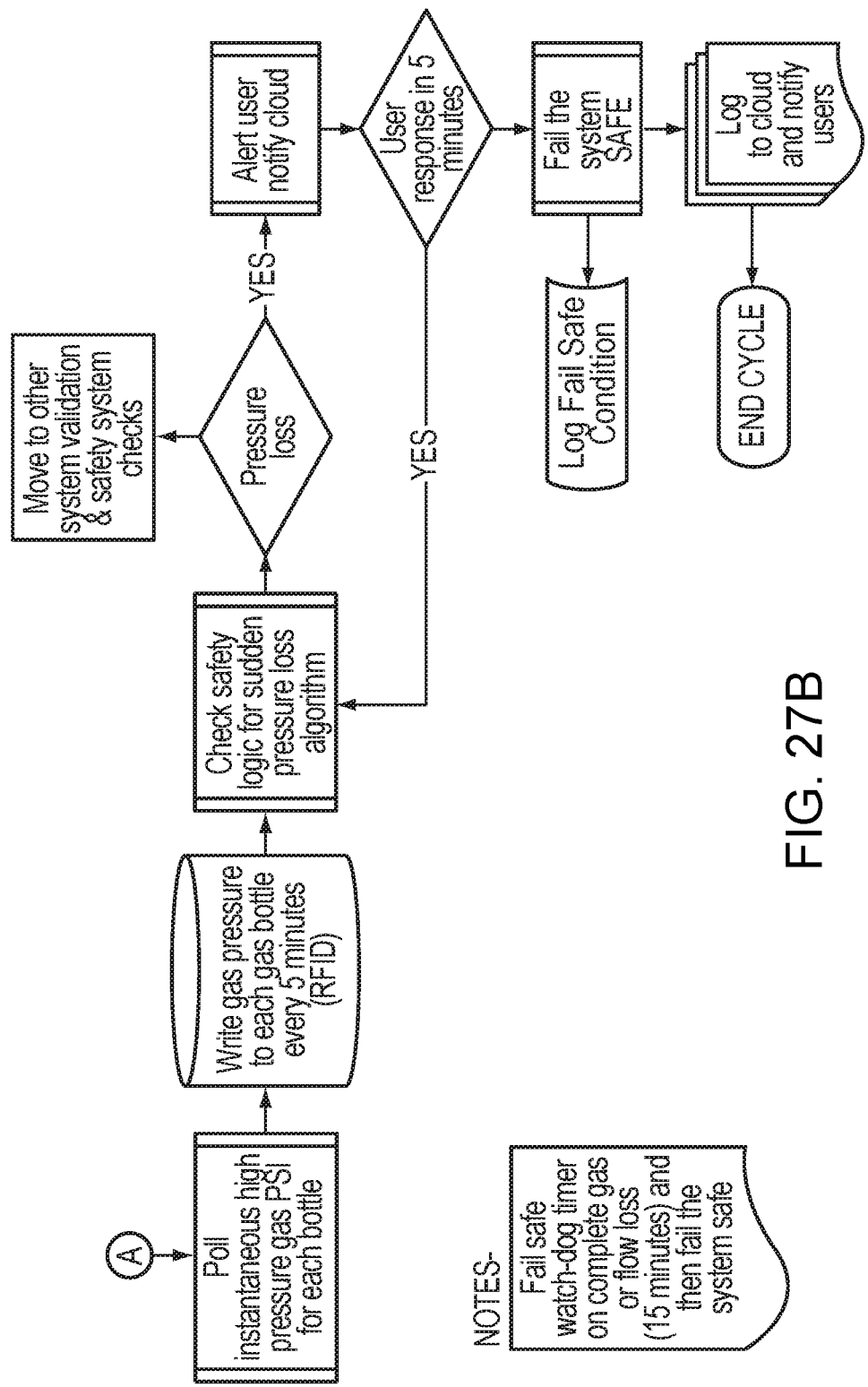

FIGS. 27A-B illustrate a flow chart 2700 of the safety and process interlocks. In example embodiments, a furnace may monitor the temperature of an internal chamber wall by thermocouple or RTD to interlock with process thermal control to indicate (a) possible reduction in efficiency of thermal insulation—indicative of pending replacement/service required (b) tertiary safety interlocking for thermal runaway indication (c) feedback loop when forced gas cooling of the load for rapid cooling option.

In other example embodiments, the furnace may be configured to make a determination of whether a tank has been approved by the furnace manufacturer and is a safe for purpose gas. This may be done via an onboard RFID interrogation and write module and interface to a cloud database. In some embodiments, an RFID tag is permanently attached to each gas cylinder in the ecosystem and the furnace software will interrogate for the correct gas per the cycle demand but more importantly, interrogate the tank encrypted data on the RFID chip to ensure a tank being installed on the system has the same gas pressure as when it was last written to.

On refill, an encrypted bit will increment to indicate that the cylinder was re-filled at a known vendor; without this bit incremented, a re-fill outside of the known ecosystem would render the bottle VOID for use. Also, the RFID chip will also hold the last known pressure prior to bottle removal (example a process change that requires a different gas) and if the pressure upon re-insertion into the furnace is greater than the last written pressure, then the bottle is VOID and the system will not allow its use. As an example, if a customer attempts to have a local vendor re-fill an empty bottle with a gas mix that is potentially explosive or flammable (e.g., methane or H2), this multi-layer safety interlock will prevent this.

Further embodiments include a furnace with an on-board high pressure gas sensing transducer for each gas that may be used with the furnace (e.g., two different gases may be employed depending on the sintering requirements), plus a low pressure gas pressure transducer for each gas stream that interfaces with the gas safety and process control systems such that the high and low pressure sensors fund the data for the RFID read-write to quantify the gas pressure and thru calculations, the total available gas volume for processing. The system will interrogate the RFID chip and cloud to ensure an Out-of-Ecosystem refill has not occurred, preserving the safety of the gas supply system and ensuring the correct species of gas used to fulfill any particular requirements by material grade.

The same gas sensing system may also initiate an automated replenishment demand via electronic data interchange/cloud connection to release gas replacement cylinders as use occurs based on the gas pressure feed-back from the sensing systems.

In yet other embodiments, the furnace may include a light curtain or FSR (force sensing resistor) or tape switch (safety edge) to prevent user from becoming entrapped in the closing bell jar door and auto return on a trip function.

Rapid Cooling

For decreasing cool down times in a sintering furnace a backfill of inert or other approved process gas may be used as the convective heat carrier (addition of Helium in some cases may aid the heat transfer) and in some cases this heat removal through gaseous thermal capacity can be aided by using forced convection by the means of a high flow—low pressure atmospherically sealed circulating pump. This inert gas would be circulated in a closed loop fashion, into and out of the furnace chamber (or via an internally contained fan/motor/blower and heat exchanger system) is passed through a heat exchanger that may be an air to air (gas to gas) heat exchanger or a gas to liquid heat exchanger where that specific heat is further transported to a liquid to air radiator and then to the external environment. For this operation heat exchanger is to be placed before the gas circulating pump to reduce the temperature seen by the pump the other configuration may also be used but is not desirable. This circulated gas can be made to flow through internal geometries of the furnace external to the insulation of internal box and external to heat spreader box and or internal to heat spreader box altogether interacting directly with the part through various mechanical slots that can be opened/closed remotely to allow directional gas impingement. While pulling hot gas inboard to the insulation process may be called 'pulling from the hot zone' wherein the heat exchanger would see a higher temperature than when pulling gas from out board the insulation. In this case, a metal crush seal might be used to connect the heat exchanger side of the manifold to the furnace instead of standard polymer or fluoroelastomer o-rings or gaskets due to the higher temperature seen by that connection point. If one is to pull gas from out board the insulation process might be called 'pulling from the cold zone' where the hot gas has to seep past the insulation contacting the vacuum chamber cold walls losing temperature along the way as it reaches the heat exchanger. In this chase the temperature seen by the heat exchanger is lower and it operates at a lower efficiency as the walls of the chamber partially act as a heat exchanger as well. In this case, the cool gas is blown directly on the retort/heat spreader box or the internal space of the retort where the parts lie. This may be leveraged to quickly reduce the part temperature from close to sintering temperature which would affect the material properties of the three-dimensional printed sintered metal part. The process parameters to this may be tuned via closed loop feedback using the pyrometer or inline thermocouples/RTD to fine tune desired material properties from the part.

Completion of Sintering

With a limited view into the hot enclosure, detecting the completion of the sintering process provides a challenge. While pyrometers may be used to provide a view into the enclosure, optical sensing may be performed using charge coupled device (CCD) array. Using a CCD array further streamlines the detection by eliminating image analysis altogether. The total power output of the CCD array provides the area of the part shadow. The area of the part shadow may be used to measure the change in size of the object as follows:

To calculate the size, let $P_e$ be the CCD output power with empty oven and $P_x$ be CCD power with part X in the oven. Then the shadow area $S=\text{const}*(P_e-P_x)$ where the 'const' multiplier comes from a lab calibration. The linear scale of the part is $$L=\text{sqrt}(S).$$

This size varies as the sintering process progresses. By observing change over time L(t), we can determine expansion/shrinkage (dL(t)/L(t)) and from that ratio determine the sintering phase.

In order to create shadow we need exposure of the chamber with light that is spectrally far enough from the chamber radiation due to heating (infrared/red/yellow range). Hence, violet or ultraviolet flash would be used from one of the chamber walls. The opposite wall would have shutter open in sync with the flash, exposing CCD array (possibly through lens) to the flash. In order to prevent blocking up of the quartz glass covering the flash and CCD array with vapors condensates, the shutters on both sides would open only briefly every sec 10 sec (or whatever the relevant time scale for L variance is). The back side of the shutter would have a wipe that removes the small amount of condensed vapor residue that may accumulate during the exposure.

Even though some residue may accumulate over longer time on quartz glass, attenuating the CCD output, this should not interfere with measurement since the same accumulation will affect equally both terms $P_e$ and $P_x$ of the output power in area expression $S=\text{const}*(P_e-P_x)$ and will be folded into the 'const' factor which gets dropped anyway in the dL/L expression for relative shrinkage. Hence, the gradual accumulation of the vapor residues in the long term on the quartz glass should not affect the measurement of the relevant dL/L ratio and thus the phase of the sintering of a single job.

Power

Because the furnace may operate at a high voltage as it supplies microwave power into the enclosure, it may have an electrical power draw higher than the standard capacity of a standard wall plug. To accommodate for this operational load, the furnace may include a battery coupled to inline power supply such that the furnace may run from a standard office outlet even though peak power may rise above the capacity of the wall plug. Power switching mechanisms, such as those found in uninterruptible power supplies may charge the battery when the furnace is not in operation.

While example embodiments have been particularly shown and described, it will be understood by those skilled in the art that various changes in form and details may be made therein without departing from the scope of the embodiments encompassed by the appended claims.

What is claimed is:

1. A furnace system, comprising:
a furnace chamber, wherein the furnace chamber includes a high-temperature insulation layer and a shell at least partially surrounding the high-temperature insulation layer, wherein the high-temperature insulation layer is configured to withstand a temperature of at least 900 degrees Celsius;
a retort assembly formed of a carbon-based material within the furnace chamber and defining a working volume, wherein the retort assembly includes a retort aperture; and
a waveguide having a proximal end and a distal end, wherein a proximal region of the waveguide extends through a portion of the high-temperature insulation layer and couples to the retort aperture, wherein the waveguide is formed of a carbon-based material configured to direct microwave radiation from a microwave source to the working volume, and wherein the waveguide includes therein a thermal insulation that is at least partially transparent to the microwave radiation,
wherein at least one of the retort assembly or the waveguide includes one or more microwave chokes or attenuators.

2. The furnace system of claim 1, wherein at least a portion of the retort assembly is formed of graphite.

3. The furnace system of claim 1, wherein at least a portion of the waveguide is formed of graphite.

4. The furnace system of claim 1, wherein the waveguide includes a graphite coating or graphite foil.

5. The furnace system of claim 1, wherein the one or more microwave chokes or attenuators are formed of silicon carbide.

6. The furnace system of claim 1, further including: at least one electrical heater positioned within the furnace chamber between the retort assembly and the high-temperature insulation layer; and a microwave power source located exterior to the furnace chamber.

7. The furnace system of claim 1, wherein a wall of the waveguide has a thickness that is less than a thickness of a wall of the retort assembly so that a thermal conductivity of the waveguide is lower than a thermal conductivity of the retort assembly.

8. The furnace system of claim 1, wherein the high-temperature insulation layer is configured to withstand a temperature greater than or equal to 1200 degrees Celsius and less than or equal to 2000 degrees Celsius.

9. The furnace system of claim 1, wherein the proximal region of the waveguide forms a microwave coupling between the waveguide and the retort aperture, and wherein the thermal insulation occupies a majority of a cross-sectional area of the interior of the waveguide.

10. A furnace system, comprising:
a furnace chamber, wherein the furnace chamber includes an insulation layer and a shell at least partially surrounding the insulation layer;
a retort assembly formed of a carbon-based material within the furnace chamber and defining a working volume, wherein the retort assembly includes a retort aperture, and wherein the retort assembly is configured to reflect microwave radiation within the working volume; and
a waveguide extending from the retort aperture to an exterior region of the furnace chamber, wherein the waveguide is formed of a carbon-based material configured to direct microwave radiation from a microwave source to the working volume, and wherein the waveguide includes therein a thermal insulation that is at least partially transparent to the microwave radiation;
wherein a wall of the waveguide has a thickness that is less than a thickness of a wall of the retort assembly so that a thermal conductivity of the waveguide is lower than a thermal conductivity of the retort assembly.

11. The furnace system of claim 10, wherein the waveguide extends through a portion of the insulation layer.

12. The furnace system of claim 10, wherein the thermal insulation that is at least partially transparent to the microwave radiation is located within a proximal region of the waveguide so that the wall of the waveguide separates the insulation that is at least partially transparent to the microwave radiation from the insulation layer of the furnace chamber.

13. The furnace system of claim 10, wherein the carbon-based material of the waveguide is a graphite foil.

14. The furnace system of claim 10, wherein at least one of the retort assembly or the waveguide includes one or more gaps, and wherein the system further comprises at least one of a microwave choke or attenuator formed of silicon carbide positioned in microwave communication with the one or more gaps.

15. The furnace system of claim 10, wherein the retort assembly is at least partially formed of graphite.

16. The furnace system of claim 10, further including a microwave power source located exterior to the furnace chamber, wherein the waveguide is coupled to the microwave source.

17. The furnace system of claim 10, wherein the furnace chamber is a sealed chamber configured to withstand negative pressures of up to 15 pounds per square inch and positive pressures of up to 15 pounds per square inch.

18. The furnace system of claim 10, wherein a cross-sectional area of the retort aperture is more than or equal to half of a wall of the retort assembly.

19. A furnace system, comprising:
a furnace chamber, wherein the furnace chamber includes an insulation layer and an outer shell at least partially surrounding the insulation layer;
a retort assembly within the insulation layer of the furnace chamber and defining a working volume, wherein the retort assembly includes a retort aperture, and wherein the retort assembly is at least partially formed of graphite and is configured to reflect microwave radiation within the working volume; and
a waveguide formed of graphite, wherein the waveguide is fluidly coupled to the retort aperture and extends through at least a portion of the insulation layer and the outer shell from the working volume to a region exterior to the furnace chamber, wherein at least one of the retort assembly or the waveguide includes one or more microwave chokes or attenuators.

20. The furnace system of claim 19, wherein the waveguide is configured to direct microwave radiation from a microwave power source exterior to the furnace chamber to the working volume.

21. The furnace system of claim 19, wherein the furnace system is configured to withstand a temperature within the working volume of 900 to 2000 degrees Celsius.

22. The furnace system of claim 19, wherein the waveguide includes an inner portion defined by at least one wall, wherein the inner portion includes therein a thermal insulation that is at least partially transparent to the microwave radiation.

23. The furnace system of claim 19, wherein the waveguide includes a cross-sectional taper in at least a portion of the waveguide.

\* \* \* \* \*